US012176619B2

(12) United States Patent
Wu et al.

(10) Patent No.: US 12,176,619 B2
(45) Date of Patent: Dec. 24, 2024

(54) ANTENNA APPARATUS AND ELECTRONIC DEVICE

(71) Applicant: Huawei Technologies Co., Ltd., Shenzhen (CN)

(72) Inventors: Pengfei Wu, Shanghai (CN); Hanyang Wang, Reading (GB); Dong Yu, Shanghai (CN); Chien-Ming Lee, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 162 days.

(21) Appl. No.: 17/759,203

(22) PCT Filed: Jan. 22, 2021

(86) PCT No.: PCT/CN2021/073326

§ 371 (c)(1),
(2) Date: Jul. 21, 2022

(87) PCT Pub. No.: WO2021/148004

PCT Pub. Date: Jul. 29, 2021

(65) Prior Publication Data

US 2023/0048914 A1 Feb. 16, 2023

(30) Foreign Application Priority Data

Jan. 22, 2020 (CN) ........................ 202010075833.X

(51) Int. Cl.
*H01Q 1/24* (2006.01)
*H01Q 1/36* (2006.01)
(Continued)

(52) U.S. Cl.
CPC ........... *H01Q 21/064* (2013.01); *H01Q 1/244* (2013.01); *H01Q 1/36* (2013.01); *H01Q 1/50* (2013.01); *H01Q 1/521* (2013.01)

(58) Field of Classification Search
CPC ........ H01Q 21/064; H01Q 1/244; H01Q 1/36; H01Q 1/50; H01Q 1/521; H01Q 1/243; H01Q 7/00
See application file for complete search history.

(56) References Cited

U.S. PATENT DOCUMENTS 5,892,487 A * 4/1999 Fujimoto ............... H01Q 19/13 343/769
7,265,724 B1 * 9/2007 Tan ...................... H01Q 9/0442 343/702
(Continued)

FOREIGN PATENT DOCUMENTS

CN 103296385 A * 9/2013
CN 104701618 A * 6/2015 ............. H01Q 1/243
(Continued)

OTHER PUBLICATIONS

Choi, J. et al., "High-Efficiency Crossed-Loop 4G LTE Antenna for All Display Metal-Rimmed Smartphones", Hindawi International Journal of Antennas and Propagation, vol. 2018, Aug. 28, 2018, 8 pages.

*Primary Examiner* — Hasan Islam
*Assistant Examiner* — Jordan E. DeWitt
(74) *Attorney, Agent, or Firm* — Slater Matsil, LLP

(57) ABSTRACT

An antenna design solution is provided. A metal frame and a PCB ground layer of an electronic device are used to form a slot. Through symmetric feeding and anti-symmetric feeding, the slot can be excited to generate two slot antenna patterns: a CM slot antenna pattern and a DM slot antenna pattern. In addition, the two slot antenna patterns share a same slot antenna radiator.

17 Claims, 39 Drawing Sheets

Back side (back-side)

(51) Int. Cl.

| | |
|---|---|
| ***H01Q 1/50*** | (2006.01) |
| ***H01Q 1/52*** | (2006.01) |
| ***H01Q 21/06*** | (2006.01) |

(56) References Cited

U.S. PATENT DOCUMENTS

| | | | | | |
|---|---|---|---|---|---|
| 10,193,597 | B1 * | 1/2019 | Garrido Lopez | H04B 5/26 | |
| 11,228,345 | B1 * | 1/2022 | Wang | H04B 5/24 | |
| 11,575,209 | B2 * | 2/2023 | Garrido Lopez | H01Q 21/28 | |
| 2002/0175864 | A1 * | 11/2002 | Fang | H01Q 21/28 | 343/702 |
| 2005/0156307 | A1 * | 7/2005 | Takahashi | H05K 1/0219 | 257/691 |
| 2008/0316115 | A1 * | 12/2008 | Hill | H01Q 9/0407 | 343/702 |
| 2009/0121948 | A1 * | 5/2009 | Nysen | H01Q 5/364 | 343/702 |
| 2010/0238079 | A1 * | 9/2010 | Ayatollahi | H01Q 1/521 | 343/729 |
| 2010/0283688 | A1 * | 11/2010 | Kinezos | H01Q 1/243 | 343/702 |
| 2011/0102290 | A1 * | 5/2011 | Milosavljevic | H01Q 9/145 | 343/852 |
| 2011/0254741 | A1 * | 10/2011 | Ishimiya | H01Q 1/405 | 343/702 |
| 2012/0056787 | A1 * | 3/2012 | Tatarnikov | H01Q 9/0457 | 343/700 MS |
| 2012/0105287 | A1 * | 5/2012 | Jung | H01Q 5/15 | 343/702 |
| 2012/0306698 | A1 * | 12/2012 | Warnick | H01Q 5/35 | 343/893 |
| 2014/0266922 | A1 * | 9/2014 | Jin | H01Q 1/243 | 343/702 |
| 2014/0266938 | A1 * | 9/2014 | Ouyang | H01Q 5/321 | 343/729 |
| 2015/0002351 | A1 * | 1/2015 | Jeong | H01Q 5/321 | 343/750 |
| 2016/0020513 | A1 * | 1/2016 | Ohguchi | H01Q 1/36 | 343/843 |
| 2016/0043473 | A1 * | 2/2016 | Walker | H01Q 1/38 | 29/601 |
| 2016/0308271 | A1 * | 10/2016 | Jin | H01Q 1/48 | |
| 2016/0309007 | A1 * | 10/2016 | Irci | H01Q 1/243 | |
| 2017/0054200 | A1 * | 2/2017 | Kang | H01Q 13/10 | |
| 2017/0125889 | A1 * | 5/2017 | Pascolini | H01Q 9/0421 | |
| 2017/0222305 | A1 * | 8/2017 | Liu | H01Q 13/10 | |
| 2017/0250475 | A1 * | 8/2017 | Liu | H01Q 21/30 | |
| 2017/0264001 | A1 * | 9/2017 | Azad | H01Q 13/10 | |
| 2018/0004247 | A1 * | 1/2018 | Liu | H01Q 13/10 | |
| 2018/0090850 | A1 * | 3/2018 | Lee | H01Q 21/30 | |
| 2018/0151943 | A1 * | 5/2018 | Lee | H01Q 13/10 | |
| 2018/0152208 | A1 * | 5/2018 | Tsai | H01Q 5/35 | |
| 2018/0269561 | A1 * | 9/2018 | Kim | H01Q 1/48 | |
| 2018/0269578 | A1 * | 9/2018 | Wu | H01Q 5/40 | |
| 2018/0342793 | A1 * | 11/2018 | Lee | H01Q 5/335 | |
| 2019/0007120 | A1 * | 1/2019 | Hu | H01Q 9/0421 | |
| 2019/0027810 | A1 * | 1/2019 | Li | H01Q 5/328 | |
| 2019/0027833 | A1 * | 1/2019 | Ayala Vazquez | H01Q 5/342 | |
| 2019/0081393 | A1 * | 3/2019 | Zhou | H05K 5/0017 | |
| 2019/0081396 | A1 * | 3/2019 | Zhou | H01Q 3/44 | |
| 2019/0097314 | A1 * | 3/2019 | Rajagopalan | H01Q 13/10 | |
| 2019/0115653 | A1 * | 4/2019 | Yun | H01Q 21/28 | |
| 2019/0198975 | A1 * | 6/2019 | Chen | H01Q 9/42 | |
| 2019/0229426 | A1 * | 7/2019 | Kim | H01Q 1/48 | |
| 2019/0260112 | A1 * | 8/2019 | Azad | H01Q 9/42 | |
| 2019/0260116 | A1 * | 8/2019 | Wei | H02J 7/02 | |
| 2020/0076058 | A1 * | 3/2020 | Zhang | H01Q 9/30 | |
| 2020/0099138 | A1 * | 3/2020 | Garrido Lopez | H01Q 9/0407 | |
| 2020/0153086 | A1 * | 5/2020 | Park | H01Q 9/0407 | |
| 2020/0321688 | A1 * | 10/2020 | Khripkov | H01Q 21/28 | |
| 2020/0328502 | A1 * | 10/2020 | Tai | H01Q 5/30 | |
| 2021/0167504 | A1 * | 6/2021 | Yu | H01Q 9/045 | |
| 2021/0194153 | A1 * | 6/2021 | Khripkov | H01Q 1/243 | |
| 2021/0296766 | A1 * | 9/2021 | Li | H04M 1/026 | |
| 2021/0313697 | A1 * | 10/2021 | Mak | H01Q 5/371 | |
| 2021/0336338 | A1 * | 10/2021 | Chang | H01Q 13/106 | |
| 2021/0399429 | A1 * | 12/2021 | Garrido Lopez | H01Q 1/44 | |
| 2022/0407217 | A1 * | 12/2022 | Wang | H01Q 5/357 | |
| 2023/0006333 | A1 * | 1/2023 | Wu | H01Q 1/50 | |
| 2023/0146114 | A1 * | 5/2023 | Wu | H01Q 5/35 | 343/702 |
| 2024/0014563 | A1 * | 1/2024 | Lai | H01Q 1/243 | |

FOREIGN PATENT DOCUMENTS

| | | | | | |
|---|---|---|---|---|---|
| CN | 104882664 | A | | 9/2015 | |
| CN | 105789844 | A | | 7/2016 | |
| CN | 105977614 | A | * | 9/2016 | H01Q 1/243 |
| CN | 106450745 | A | * | 2/2017 | H01Q 1/24 |
| CN | 106532228 | A | | 3/2017 | |
| CN | 109449595 | A | | 3/2019 | |
| CN | 110137664 | A | | 8/2019 | |
| CN | 110165373 | A | | 8/2019 | |
| EP | 2650963 | A1 | * | 10/2013 | H01Q 1/243 |
| EP | 3007274 | A1 | * | 4/2016 | H01Q 1/38 |
| WO | WO-2019068331 | A1 | * | 4/2019 | H01Q 1/243 |

* cited by examiner

TO FIG. 14B

CONT. FROM FIG. 14A

ANTENNA APPARATUS AND ELECTRONIC DEVICE

CROSS-REFERENCE TO RELATED APPLICATIONS

This application is a National Stage of International Patent Application No. PCT/CN2021/073326, filed on Jan. 22, 2021, which claims priority to Chinese Patent Application No. 202010075833. X, filed on Jan. 22, 202, both of which are hereby incorporated by reference in their entireties.

TECHNICAL FIELD

The present invention relates to the field of antenna technologies, and in particular, to an antenna apparatus used in an electronic device.

BACKGROUND

A multi-input multi-output (multi-input multi-output, MIMO) technology plays a very important role in a 5th generation (5th generation, 5G) wireless communications system. However, it is still a great challenge for a mobile terminal, such as a mobile phone, to achieve good MIMO performance. One of the reasons is that very limited space inside the mobile terminal limits a frequency band that a MIMO antenna can cover and high performance.

SUMMARY

Embodiments of the present invention provide an electronic device. Both a differential mode slot antenna and a common mode slot antenna are excited on a same slot antenna radiator, so that characteristics such as high isolation and a low ECC of a MIMO antenna can be achieved.

According to a first aspect, an embodiment of this application provides an electronic device, and the electronic device includes a PCB, a metal frame, and an antenna apparatus. The antenna apparatus may include a slot, a first feeding point, a second feeding point, and a bridge structure.

The slot may be disposed between the PCB and a first segment of the metal frame. Both ends of the slot may be grounded. The slot may include a first side edge and a second side edge, the first side edge may include one side edge of the PCB, and the second side edge may include the first segment of the metal frame. A gap may be disposed on the second side edge. The second side edge may include a first part and a second part, the first part may be located on one side of the gap, and the second part may be located on the other side of the gap.

The first feeding point may be located on the first part of the second side edge, and the second feeding point may be located on the second part of the second side edge. The first feeding point may be connected to a positive electrode of a feed of the antenna apparatus, and the second feeding point may be connected to a negative electrode of the feed of the antenna apparatus.

The bridge structure may include a first end and a second end. The first end may be connected to the first part, or extend to the slot across the first side edge. The second end may be connected to the second part, or extend to the slot across the first side edge. A third feeding point may be disposed on the bridge structure, and the third feeding point may be connected to the positive electrode of the feed.

In the first aspect, a feeding structure including the first feeding point and the second feeding point may excite the slot to generate a CM slot antenna pattern. This feeding structure is anti-symmetric feeding mentioned in subsequent embodiments. Distribution of electric fields and currents in the CM slot antenna pattern has the following characteristics: The currents are distributed in a same direction on two sides of the gap, but the electric fields are distributed in opposite directions on two sides of the gap. The currents and the electric fields in the CM slot antenna pattern may be generated when slots on two sides of the gap each work in a ¼ wavelength mode.

In the first aspect, a feeding structure including the bridge structure and the third feeding point disposed on the bridge structure may excite the slot to generate a DM slot antenna pattern. This feeding structure is symmetric feeding mentioned in subsequent embodiments. Distribution of electric fields and currents in the DM slot antenna pattern has the following characteristics: The currents are distributed in opposite directions on two sides of the gap, but the electric fields are distributed in a same direction on two sides of the gap. The currents and the electric fields in the DM slot antenna pattern may be generated when the entire slot works in a ½ wavelength mode.

It can be learned that, in the antenna design solution used for the electronic device in the first aspect, the metal frame and a PCB ground layer of the electronic device are used to form the slot. Through symmetric feeding and anti-symmetric feeding, the slot can be excited to generate two slot antenna patterns: the CM slot antenna pattern and the DM slot antenna pattern, so that characteristics such as high isolation and a low ECC of a MIMO antenna can be achieved in a wideband. In addition, the two slot antenna patterns share a same slot antenna radiator, so that antenna design space can be saved.

With reference to the first aspect, in some embodiments, the first feeding point and the second feeding point may be connected to a feeding network of the feed, and the feeding network may include two symmetric parallel conducting wires that are formed by hollowing out the PCB ground layer and that extend from the ground layer.

With reference to the first aspect, in some embodiments, the bridge structure may be a metal support obtained through laser direct structuring LDS, and may be disposed on a back side of a PCB 17. The bridge structure can optimize impedance matching. In two sides of the PCB 17, a side on which a PCB ground layer is disposed may be referred to as a PCB front side, and the other side (on which no PCB ground layer is disposed) may be referred to as a PCB back side.

With reference to the first aspect, in some embodiments, the gap may be disposed in a middle position on the second side edge, or may be disposed away from the middle position.

With reference to the first aspect, in some embodiments, the slot may be a U-shaped slot. For example, the slot may extend from a bottom edge of the metal frame to two side edges of the metal frame, and may be a U-shaped slot located at the bottom of the electronic device. Similarly, the slot may alternatively be a U-shaped slot located at the top of the electronic device, or a U-shaped slot on a side edge of the electronic device.

With reference to the first aspect, in some embodiments, the slot may be an L-shaped slot. For example, the slot may extend from a bottom edge of the metal frame to one side edge of the metal frame, and may be an L-shaped slot located on the left side or the right side at the bottom of the electronic device. Similarly, the slot may alternatively be an L-shaped slot located at the top of the electronic device.

With reference to the first aspect, in some embodiments, a disposing position of the antenna apparatus in the electronic device may be one or more of the following: the bottom of the electronic device, the top of the electronic device, or a side edge of the electronic device.

With reference to the first aspect, in some embodiments, the electronic device may include a plurality of antenna apparatuses, and the plurality of antenna apparatuses may be disposed in a plurality of positions such as the top of the electronic device, the bottom of the electronic device, or the side edge of the electronic device. For example, if the electronic device includes two antenna apparatuses, the two antenna apparatuses may be separately disposed at the top and the bottom of the electronic device.

With reference to the first aspect, in some embodiments, the first feeding point and the second feeding point may be respectively connected to the positive electrode and the negative electrode of the feed through a coaxial transmission line, the first feeding point is specifically connected to a center conductor of the coaxial transmission line, and the second feeding point is specifically connected to an outer conductor of the coaxial transmission line.

With reference to the first aspect, in some embodiments, the first feeding point and the second feeding point may be disposed close to the gap, or may be separately disposed close to two ends of the slot.

With reference to the first aspect, in some embodiments, a size of the bridge structure is large, and some lumped devices (such as a lumped inductor) may be added to reduce the size, that is, a part of the bridge structure is a lumped device.

With reference to the first aspect, in some embodiments, the bridge structure is not limited to the LDS metal support mounted on the back side of the PCB, and may alternatively be formed by hollowing out the PCB ground layer.

According to a second aspect, an embodiment of this application provides an electronic device, and the electronic device includes a PCB, a metal frame, and an antenna apparatus. The antenna apparatus may include a slot, a first feeding point, a second feeding point, and a bridge structure.

The slot may be disposed between the PCB and a first segment of the metal frame, the first segment of the metal frame includes a first end and a second end, and both ends of the slot are grounded. The slot may include a first side edge and a second side edge, the first side edge may include one side edge of the PCB, and the second side edge may include the first segment of the metal frame. A plurality of gaps may be disposed on the second side edge. The second side edge may include a first part, a second part, and a third part, the first part may be located on one side of the third part, and the second part may be located on the other side of the third part. The third part may include a first gap, a second gap, and a suspended segment located between the first gap and the second gap.

The first feeding point may be located on the first part of the second side edge, and the second feeding point may be located on the second part of the second side edge. The first feeding point may be connected to a positive electrode of a feed of the antenna apparatus, and the second feeding point may be connected to a negative electrode of the feed of the antenna apparatus.

The bridge structure may include a first end and a second end. The first end may be connected to the first part, or extend to the slot across the first side edge. The second end may be connected to the second part, or extend to the slot across the first side edge. A third feeding point may be disposed on the bridge structure, and the third feeding point may be connected to the positive electrode of the feed.

It can be learned that a difference between the second aspect and the first aspect lies in that there are two gaps on the second side edge in the second aspect: the first gap and the second gap. Not limited to two gaps, the third part may include three or more gaps and suspended segments between these gaps.

With reference to the second aspect, in some embodiments, the bridge structure may further be connected to the suspended segment in the third part.

With reference to the second aspect, in some embodiments, the bridge structure may include a T-shaped structure. The T-shaped structure is connected to slots on two sides of the gaps, and a suspended metal frame between the gaps. Specifically, the T-shaped structure may include a horizontal stub and a vertical stub. Two ends of the horizontal stub are respectively the first end and the second end, and are respectively connected to the first part of the second side edge and the second part of the second side edge. The vertical stub is connected to the suspended segment.

With reference to the second aspect, in some embodiments, the bridge structure may be a metal support obtained through laser direct structuring LDS, and may be disposed on a back side of the PCB. The bridge structure can optimize impedance matching. In two sides of the PCB, a side on which a PCB ground layer is disposed may be referred to as a PCB front side, and the other side (on which no PCB ground layer is disposed) may be referred to as a PCB back side.

With reference to the second aspect, in some embodiments, the gap may be disposed in a middle position on the second side edge, or may be disposed away from the middle position.

With reference to the second aspect, in some embodiments, the slot may be a U-shaped slot. For example, the slot may extend from a bottom edge of the metal frame to two side edges of the metal frame, and may be a U-shaped slot located at the bottom of the electronic device. Similarly, the slot may alternatively be a U-shaped slot located at the top of the electronic device, or a U-shaped slot on a side edge of the electronic device.

With reference to the second aspect, in some embodiments, the slot may be an L-shaped slot. For example, the slot may extend from a bottom edge of the metal frame to one side edge of the metal frame, and may be an L-shaped slot located on the left side or the right side at the bottom of the electronic device. Similarly, the slot may alternatively be an L-shaped slot located at the top of the electronic device.

With reference to the second aspect, in some embodiments, a disposing position of the antenna apparatus in the electronic device may be one or more of the following: the bottom of the electronic device, the top of the electronic device, or a side edge of the electronic device.

With reference to the second aspect, in some embodiments, the electronic device may include a plurality of antenna apparatuses, and the plurality of antenna apparatuses may be disposed in a plurality of positions such as the top of the electronic device, the bottom of the electronic device, or the side edge of the electronic device. For example, if the electronic device includes two antenna apparatuses, the two antenna apparatuses may be separately disposed at the top and the bottom of the electronic device.

With reference to the second aspect, in some embodiments, the first feeding point and the second feeding point may be respectively connected to the positive electrode and the negative electrode of the feed through a coaxial transmission line, the first feeding point is specifically connected to a center conductor of the coaxial transmission line, and the second feeding point is specifically connected to an outer conductor of the coaxial transmission line.

With reference to the second aspect, in some embodiments, the first feeding point and the second feeding point may be disposed close to the gap, or may be separately disposed close to two ends of the slot.

With reference to the second aspect, in some embodiments, a size of the bridge structure is large, and some lumped devices (such as a lumped inductor) may be added to reduce the size, that is, a part of the bridge structure is a lumped device.

With reference to the second aspect, in some embodiments, the bridge structure is not limited to the LDS metal support mounted on the back side of the PCB, and may alternatively be formed by hollowing out the PCB ground layer.

BRIEF DESCRIPTION OF THE DRAWINGS

To describe technical solutions in embodiments of this application more clearly, the following describes the accompanying drawings used in embodiments of this application.

DETAILED DESCRIPTION OF ILLUSTRATIVE EMBODIMENTS

The following describes embodiments of the present invention with reference to the accompanying drawings in embodiments of the present invention.

The technical solutions provided in this application are applicable to an electronic device that uses one or more of the following communications technologies: a Bluetooth (Bluetooth, BT) communications technology, a global positioning system (global positioning system, GPS) communications technology, a wireless fidelity (wireless fidelity, Wi-Fi) communications technology, a global system for mobile communications (global system for mobile communications, GSM) communications technology, a wideband code division multiple access (wideband code division multiple access, WCDMA) communications technology, a long term evolution (long term evolution, LTE) communications technology, a 5G communications technology, a sub-6G communications technology, other future communications technologies, and the like. In this application, the electronic device may be a mobile phone, a tablet computer, a personal digital assistant (personal digital assistant, PDA), or the like.

Figure 1:
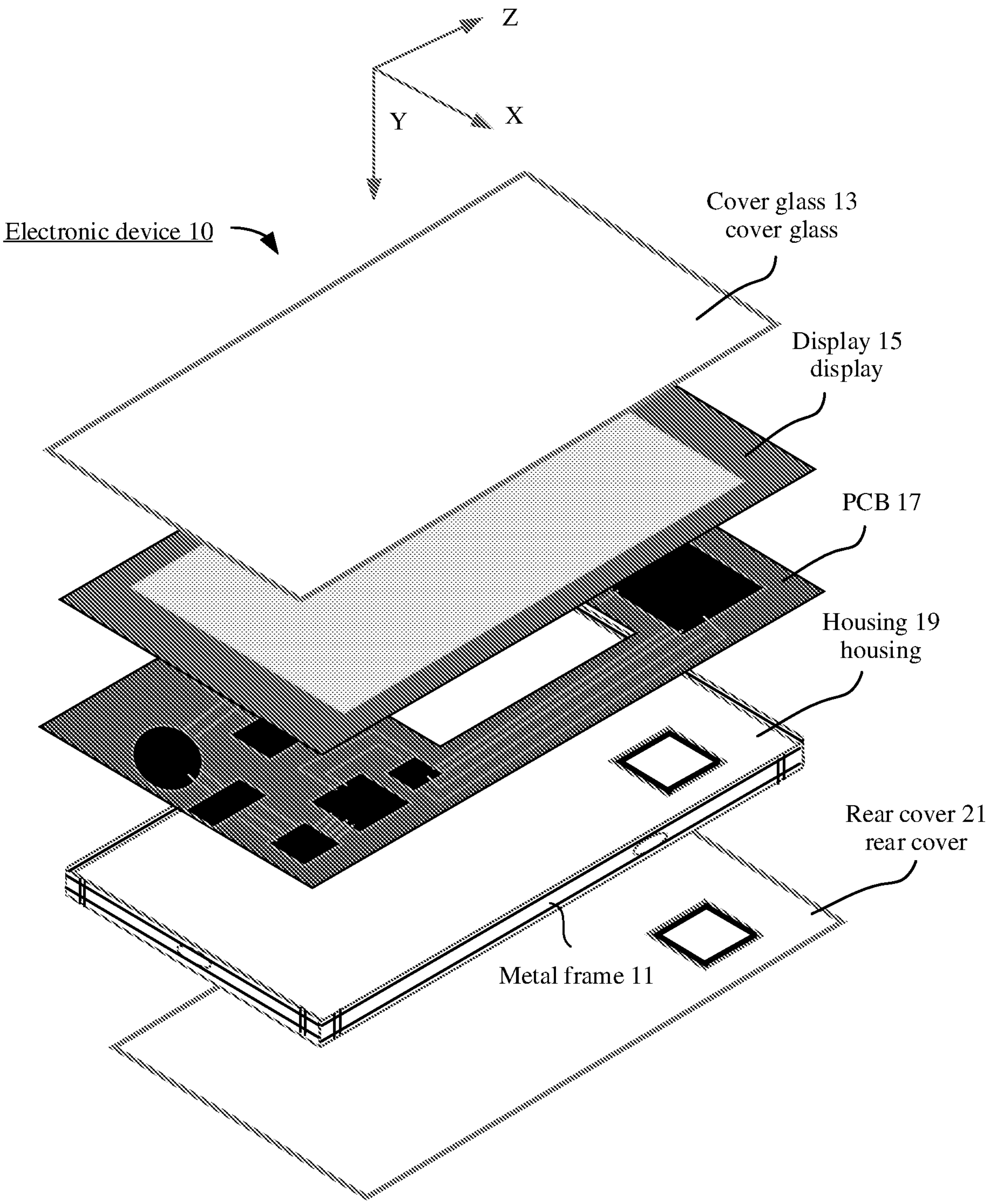
FIG. 1 is a schematic diagram of a structure of an electronic device on which an antenna design solution is based according to this application.

FIG. 1 shows an example of an internal environment of an electronic device on which an antenna design solution provided in this application is based. As shown in FIG. 1, the electronic device 10 may include cover glass 13, a display 15, a printed circuit board PCB 17, a housing 19, and a rear cover 21.

The cover glass 13 may be disposed snugly against the display 15, and may be mainly used to protect the display 15 against dust.

The printed circuit board PCB 17 may be an FR-4 dielectric board, or may be a Rogers (Rogers) dielectric board, or may be a hybrid dielectric board of Rogers and FR-4, or the like. Herein, FR-4 is a grade designation for a flame-retardant material, and the Rogers dielectric board is a high frequency board. A metal layer may be disposed on a side that is of the printed circuit board PCB 17 and that is close to the housing 19, and the metal layer may be formed by etching metal on a surface of the PCB 17. The metal layer may be used to ground an electronic element carried on the printed circuit board PCB 17, to prevent an electric shock of a user or device damage. The metal layer may be referred to as a PCB ground layer. In this application, in two sides of the PCB 17, a side on which the PCB ground layer is disposed may be referred to as a PCB front side (front side), and the other side (on which no PCB ground layer is disposed) may be referred to as a PCB back side (back side).

The housing 19 is mainly used to support the entire device. The housing 19 may include a metal frame 11, and the metal frame 11 may be made of a conductive material such as metal. The metal frame 11 may extend around a periphery of the PCB 17 and the display 15, to help fasten the display 15. In an implementation, the metal frame 11 made of the metal material may be directly used as a metal frame of the electronic device 10 to form a metal frame appearance, and this is applicable to a metal ID. In another implementation, a non-metal frame such as a plastic frame may be disposed on an outer surface of the metal frame 11 to form a non-metal frame appearance, and this is applicable to a non-metal ID.

The metal frame 11 may be divided into four parts, and the four parts may be named as a bottom edge, a top edge, and two side edges based on different locations of the four parts in the electronic device. The top edge may be disposed at the top of the electronic device 10, and the bottom edge may be disposed at the bottom of the electronic device 10. The two side edges may be respectively disposed on two sides of the electronic device 10. Components such as a front-facing camera (not shown), an earpiece (not shown), and an optical proximity sensor (not shown) may be disposed at the top of the electronic device 10. A USB charging interface (not shown), a microphone (not shown), and the like may be disposed at the bottom of the electronic device 10. A volume adjustment button (not shown) and a power button (not shown) may be disposed at the side edges of the electronic device 10.

The rear cover 21 may be a rear cover made of a non-metal material, for example, a non-metal rear cover such as a glass rear cover or a plastic rear cover, or may be a rear cover made of a metal material.

FIG. 1 shows only an example of some components included in the electronic device 10. Actual shapes, actual sizes, and actual construction of these components are not limited in FIG. 1.

The electronic device 10 may use a bezel-less screen industrial design (industry design, ID) to bring more comfortable visual experience to users. The bezel-less screen means a large screen-to-body ratio (which is usually over 90%). Because a width of a bezel of the bezel-less screen is greatly reduced, internal components of the electronic device 10, such as a front-facing camera, a receiver, a fingerprint sensor, and an antenna, need to be rearranged. Especially for an antenna design, a clearance area is reduced and antenna space is further compressed.

In the conventional technology, when antenna design space is further reduced, on a mobile phone with a common ID such as a metal frame or a glass rear cover, a plurality of different radiators are usually deployed around the entire mobile phone to implement a MIMO antenna. However, the plurality of different radiators need to meet high requirements in terms of an antenna form, grounding, feeding, and the like, to achieve high antenna isolation and a low envelope correlation coefficient (envelope correlation coefficient, ECC). The following uses an example for description.

Figure 2A:
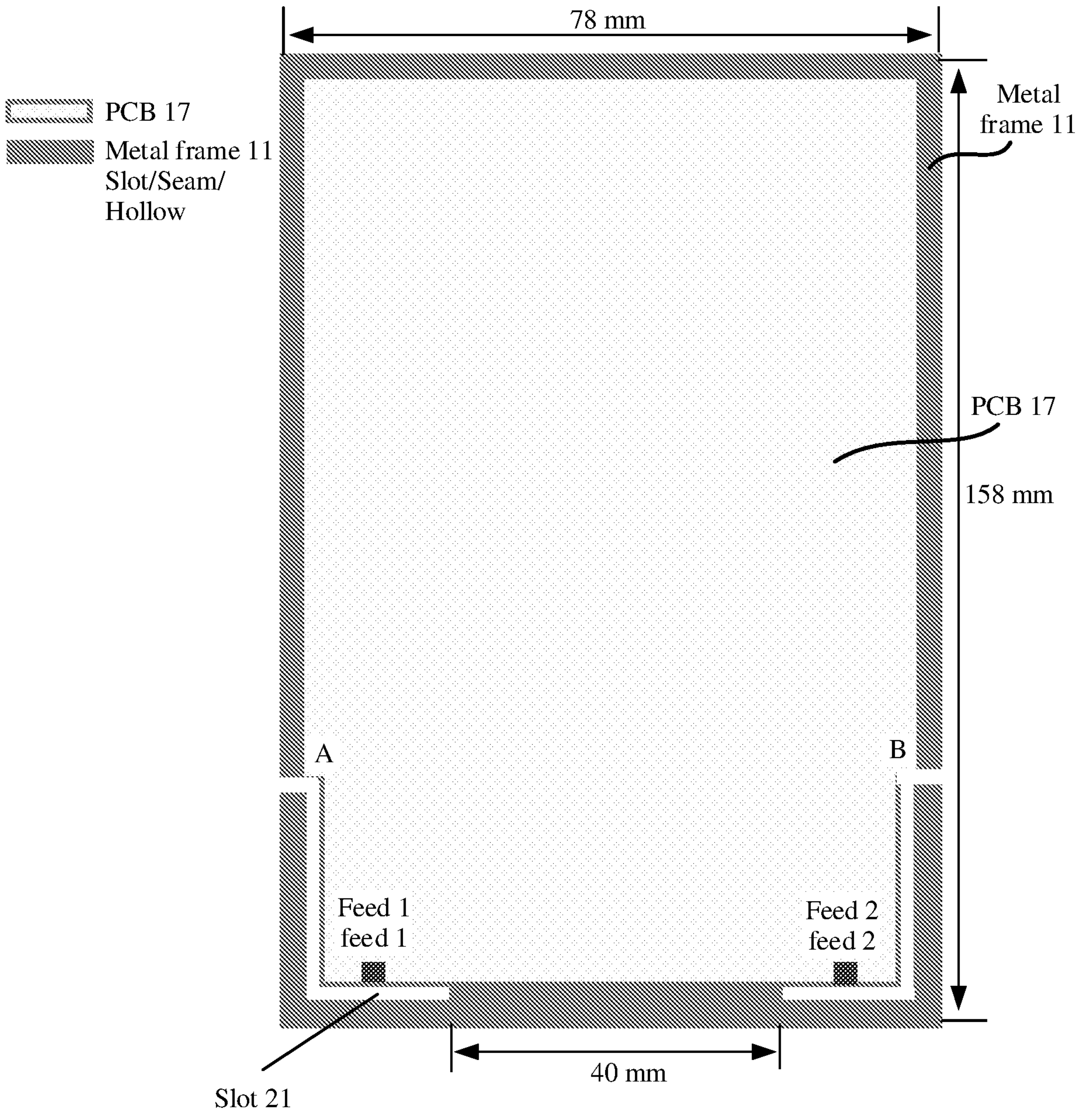
FIG. 2A is a schematic diagram of a MIMO antenna design solution in the conventional technology.
Figure 2B:
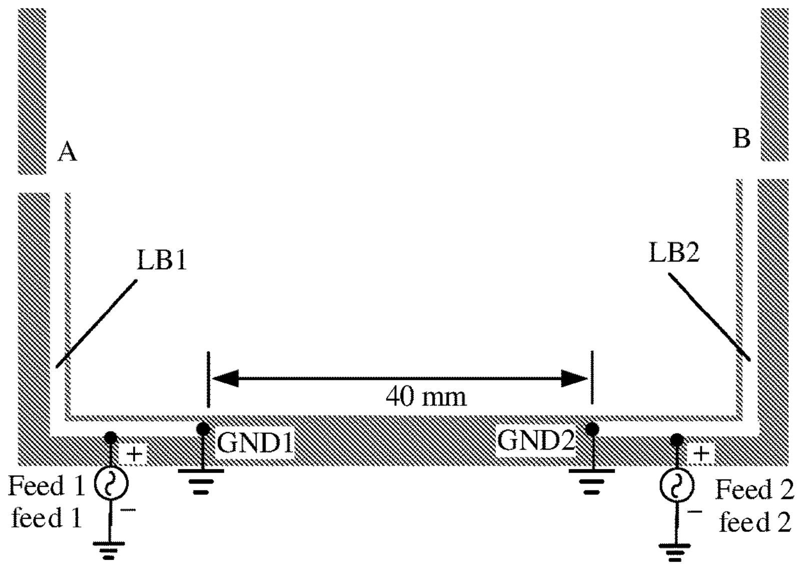
FIG. 2B is a principle structural diagram of the antenna design solution shown in FIG. 2A.

FIG. 2A shows an example of a simulation model in the conventional technology. FIG. 2B is a principle structural diagram of the model shown in FIG. 2A. As shown in FIG. 2A and FIG. 2B, parameters of the entire device are set as follows: A length is 158 mm, and a width is 78 mm. A slot 21 between the metal frame 11 and the PCB ground layer may be used to form two slot antenna radiators in a ¼ wavelength mode that have one end open and one end grounded: a low-frequency slot antenna LB1 and a low-frequency slot antenna LB2. The two slot antennas are respectively distributed on two sides at the bottom of the electronic device 10. A grounding end GND1 of the low-frequency slot antenna LB1 is adjacent to a grounding end GND2 of the low-frequency slot antenna LB2. A distance between GND1 and GND2 is set to 40 mm.

Figure 3A:
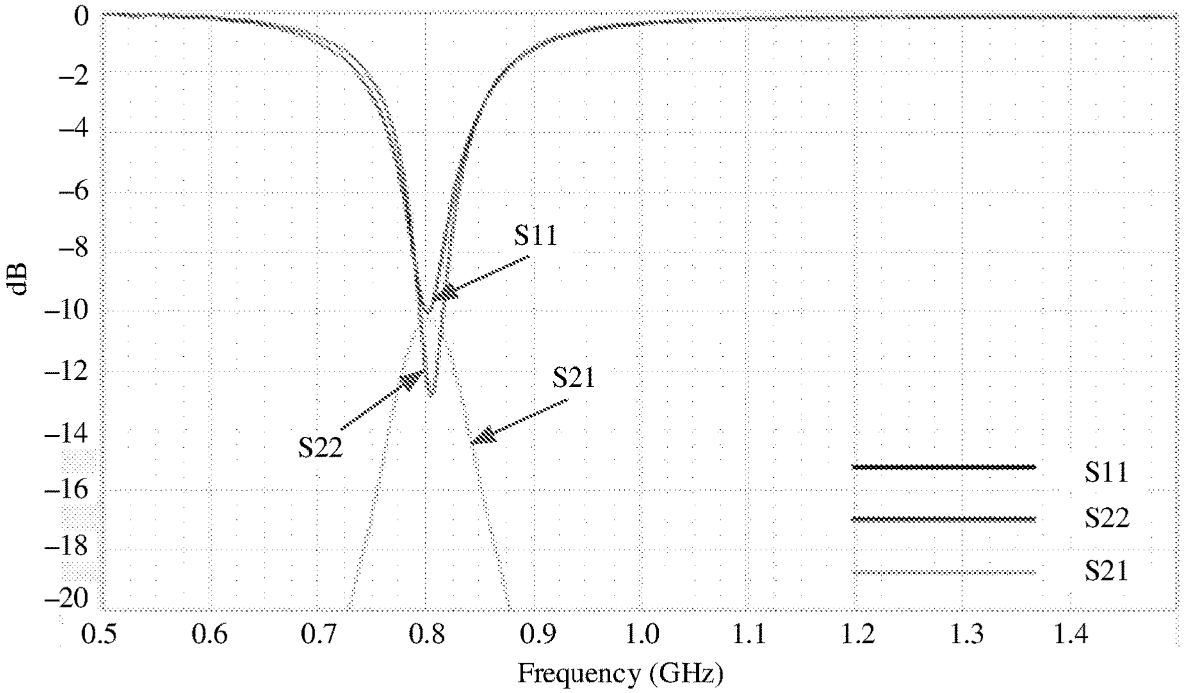
FIG. 3A is an S11 simulation diagram of the antenna design solution shown in FIG. 2A.
Figure 3B:
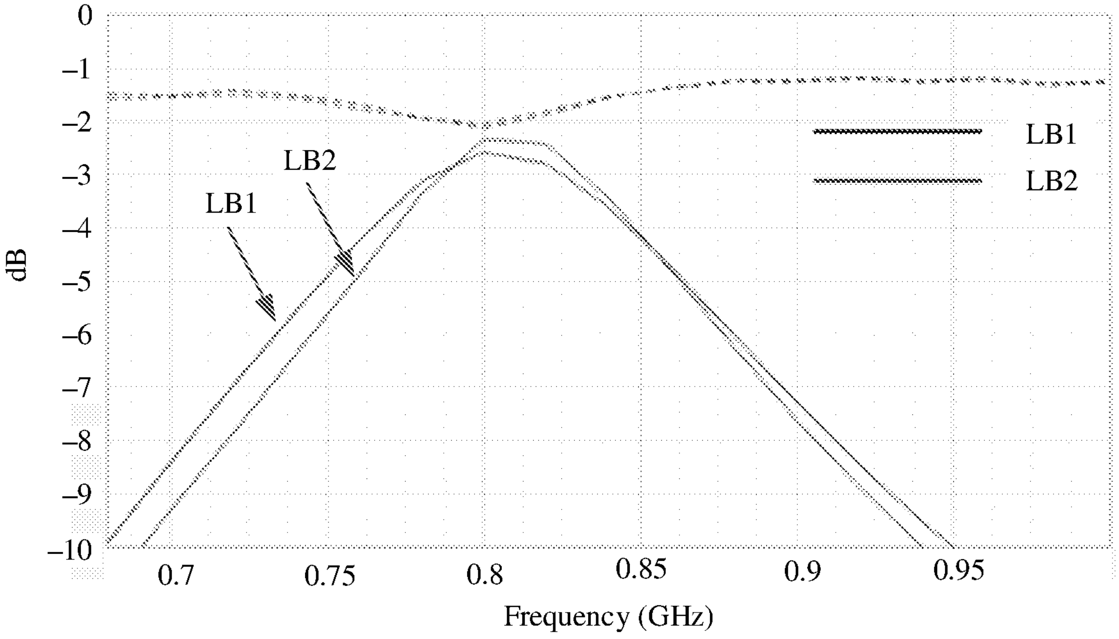
FIG. 3B is an efficiency simulation diagram of the antenna design solution shown in FIG. 2A.
Figure 3C:
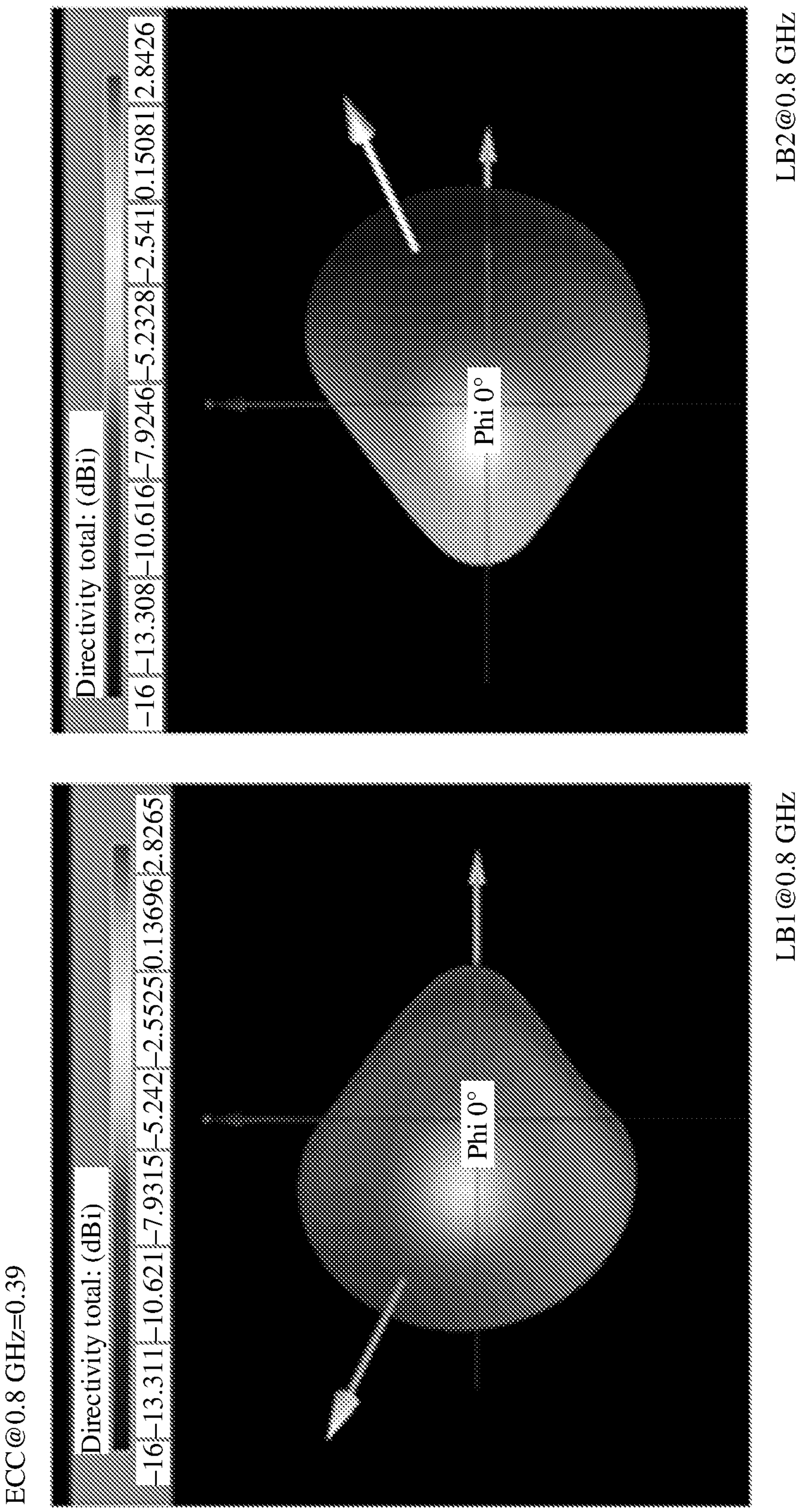
FIG. 3C is a diagram of radiation directions in the antenna design solution shown in FIG. 2A.

FIG. 3A shows an S parameter simulation of the example antenna structure shown in FIG. 2A. S11 and S22 represent S parameter curves of the slot antenna LB1 and the slot antenna LB2 respectively, and S21 represents isolation between the slot antenna LB1 and the slot antenna LB2. FIG. 3B shows radiation efficiency and system efficiency of the example antenna structure shown in FIG. 2A. A curve LB1 and a curve LB2 represent efficiency curves of the slot antenna LB1 and the slot antenna LB2, respectively. FIG. 3C shows radiation directions of the example antenna structure shown in FIG. 2A. It can be learned that, in the conventional solution in which a plurality of different radiators are arranged around the entire device to implement the MIMO antenna, although the distance between the respective grounding ends of the slot antenna LB1 and the slot antenna LB2 is long (up to 40 mm), isolation between the slot antenna LB1 and the slot antenna LB2 is not ideal (10 dB), and an ECC is up to 0.4.

This application provides a MIMO antenna design solution. Through symmetric feeding and anti-symmetric feeding, a differential mode slot antenna and a common mode slot antenna are excited on a same slot antenna radiator, so that characteristics such as high isolation and a low ECC of a MIMO antenna can be achieved.

First, two antenna patterns in this application are described.

1. Common Mode (Common Mode, CM) Slot Antenna Pattern

Figure 4A:
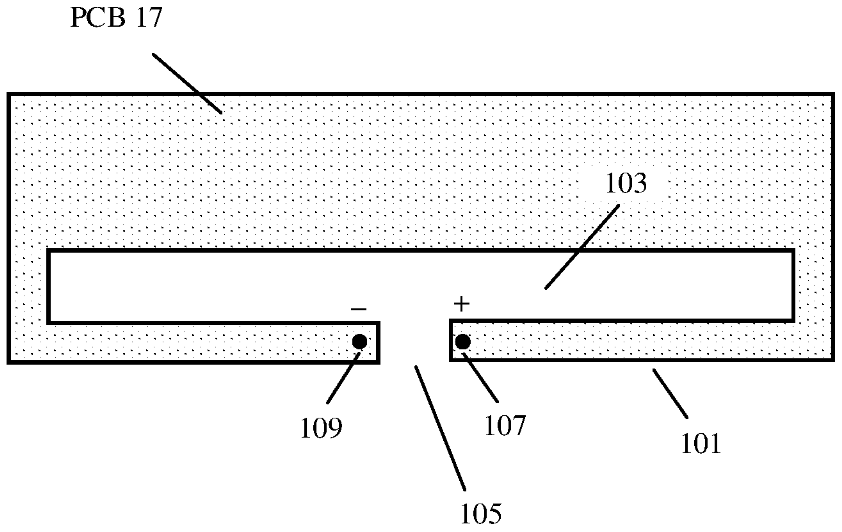
FIG. 4A is a schematic diagram of a CM slot antenna according to this application.

As shown in FIG. 4A, a slot antenna 101 may include a slot 103, a feeding point 107, and a feeding point 109. The slot 103 may be disposed on a PCB ground layer. An opening 105 is disposed on one side of the slot 103, and the opening 105 may be specifically disposed in a middle position on the side. The feeding point 107 and the feeding point 109 may be respectively disposed on two sides of the opening 105. The feeding point 107 and the feeding point 109 may be respectively configured to connect to a positive electrode and a negative electrode of a feed of the slot antenna 101. For example, a coaxial transmission line is used to feed the slot antenna 101. A center conductor of the coaxial transmission line(transmission line center conductor) may be connected to the feeding point 107 through the transmission line, and an outer conductor of the coaxial transmission line (transmission line outer conductor) may be connected to the feeding point 109 through the transmission line. The coaxial transmission line outer conductor is grounded.

In other words, the slot antenna 101 may be fed at the opening 105, and the opening 105 may also be referred to as a feeding position. The positive electrode of the feed may be connected to one side of the opening 105, and the negative electrode of the feed may be connected to the other side of the opening 105.

Figure 4B:
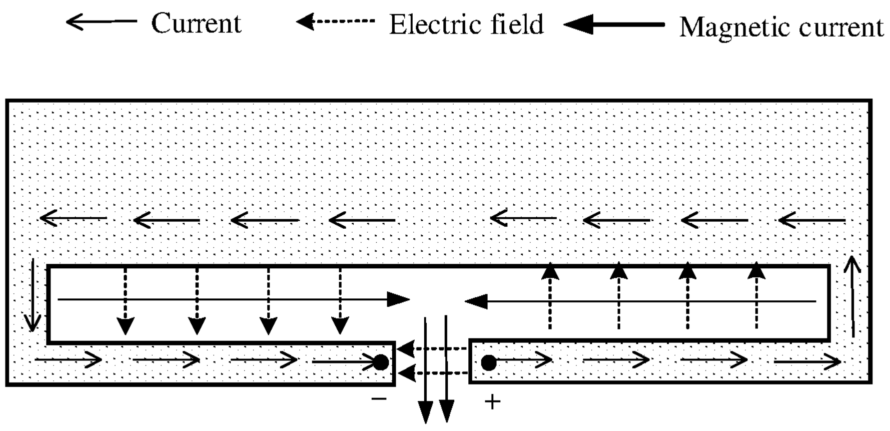
FIG. 4B is a schematic diagram of distribution of currents, electric fields, and magnetic currents in a CM slot antenna pattern.

FIG. 4B shows distribution of currents, electric fields, and magnetic currents of the slot antenna 101. As shown in FIG. 4B, the currents are distributed in a same direction on two sides of a middle position of the slot antenna 101, but the electric fields and the magnetic currents are distributed in opposite directions on two sides of the middle position of the slot antenna 101. The feeding structure shown in FIG. 4A may be referred to as an anti-symmetric feeding structure. The slot antenna pattern shown in FIG. 4B may be referred to as a CM slot antenna pattern. The currents, electric fields, and magnetic currents shown in FIG. 4B may be respectively referred to as currents, electric fields, and magnetic currents in the CM slot antenna pattern.

The currents and the electric fields in the CM slot antenna pattern are generated when slots on two sides of the middle position of the slot antenna 101 separately work in a ¼ wavelength mode. The currents are weak in the middle position of the slot antenna 101, and are strong at both ends of the slot antenna 101. The electric fields are strong in the middle position of the slot antenna 101, and are weak at both ends of the slot antenna 101.

2. Differential Mode (Differential Mode, DM) Slot Antenna Pattern

Figure 5A:
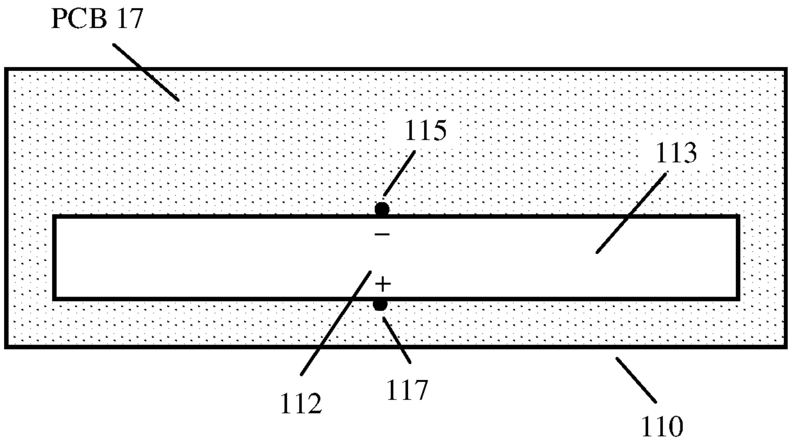
FIG. 5A is a schematic diagram of a DM slot antenna according to this application.

As shown in FIG. 5A, a slot antenna 110 may include a slot 113, a feeding point 117, and a feeding point 115. The slot 113 may be disposed on a PCB ground layer. The feeding point 117 and the feeding point 115 may be respectively disposed in middle positions of two side edges of the slot 113. The feeding point 117 and the feeding point 115 may be respectively configured to connect to a positive electrode and a negative electrode of a feed of the slot antenna 110. For example, a coaxial transmission line is used to feed the slot antenna 110. A center conductor of the coaxial transmission line may be connected to the feeding point 117 through the transmission line, and an outer conductor of the coaxial transmission line may be connected to the feeding point 115 through the transmission line. The coaxial transmission line outer conductor is grounded.

In other words, a middle position 112 of the slot antenna 110 is connected to the feed, and the middle position 112 may also be referred to as a feeding position. The positive electrode of the feed may be connected to one side edge of the slot 113, and the negative electrode of the feed may be connected to the other side edge of the slot 113.

Figure 5B:
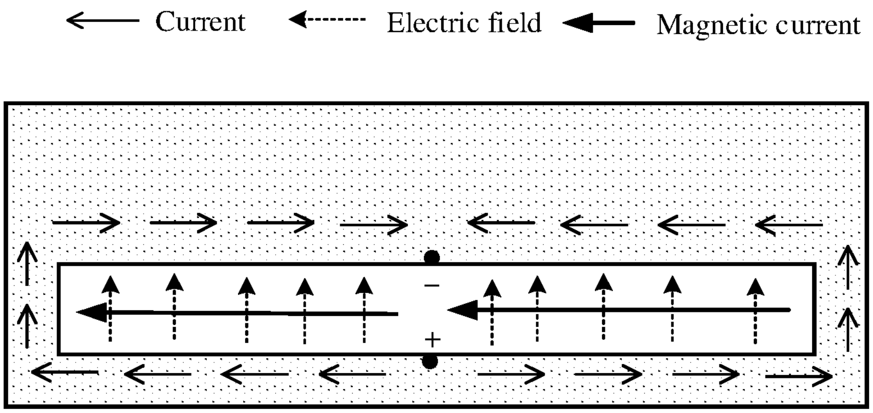
FIG. 5B is a schematic diagram of distribution of currents, electric fields, and magnetic currents in a DM slot antenna pattern.

FIG. 5B shows distribution of currents, electric fields, and magnetic currents of the slot antenna 110. As shown in FIG. 5B, the currents are distributed in opposite directions on two sides of the middle position 112 of the slot antenna 110, but the electric fields and the magnetic currents are distributed in a same direction on two sides of the middle position 112 of the slot antenna 110. The feeding structure shown in FIG. 5A may be referred to as a symmetric feeding structure. The slot antenna pattern shown in FIG. 5B may be referred to as a DM slot antenna pattern. The currents, electric fields, and magnetic currents shown in FIG. 5B may be respectively referred to as currents, electric fields, and magnetic currents in the DM slot antenna pattern.

The currents and electric fields in the DM slot antenna pattern are generated when the entire slot 21110 works in a ½ wavelength mode. The currents are weak in the middle position of the slot antenna 110, and are strong at both ends of the slot antenna 110. The electric fields are strong in the middle position of the slot antenna 110, and are weak at both ends of the slot antenna 110.

The following describes in detail a plurality of embodiments provided in this application with reference to the accompanying drawings. In the following embodiments, antenna simulation is based on the following environment: An overall width is 78 mm, and an overall length is 158 mm. The metal frame 11 has a thickness of 4 mm and a width of 3 mm, and an antenna clearance of a Z-direction projection area is 1 mm. Widths of gaps (for example, a gap 25) on the metal frame 11 are all in a range of 1 mm to 2 mm. A dielectric constant of materials filled in a slot (for example, a slot 21) formed between the metal frame 11 and the PCB ground layer, in a gap 25 on the metal frame 11, and in a gap between a bridge structure 29 and the PCB ground layer is 3.0, and a loss angle is 0.01.

Embodiment 1

In this embodiment, a slot is formed between a metal frame 11 and a PCB ground layer. Through symmetric feeding and anti-symmetric feeding, the slot is excited to generate two low-frequency (an operating frequency band is near LTE B5) antenna patterns: a CM slot antenna pattern and a DM slot antenna pattern.

Figure 6A:
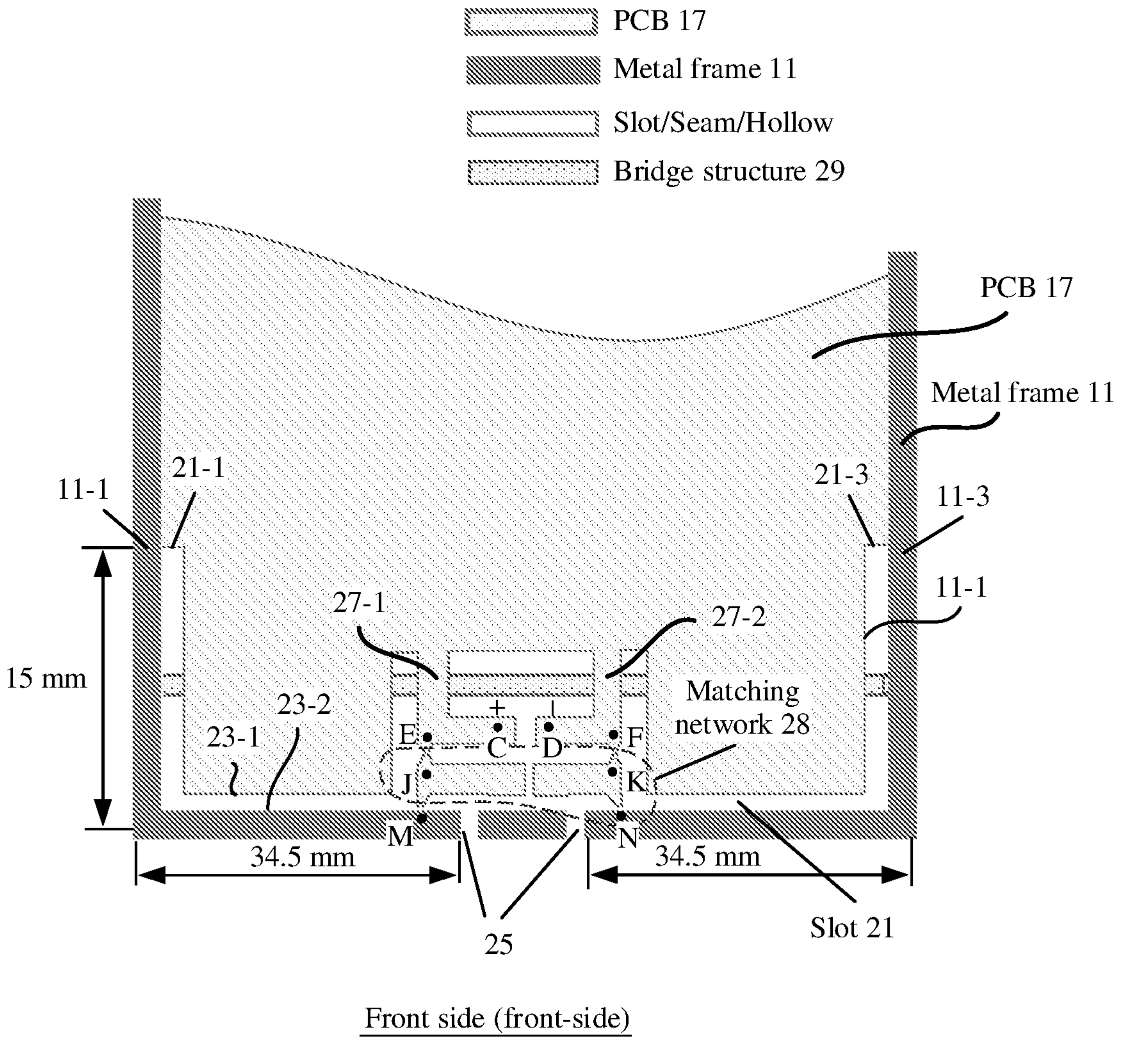
FIG. 6A is a front-side view of an antenna apparatus according to Embodiment 1.
Figure 6B:
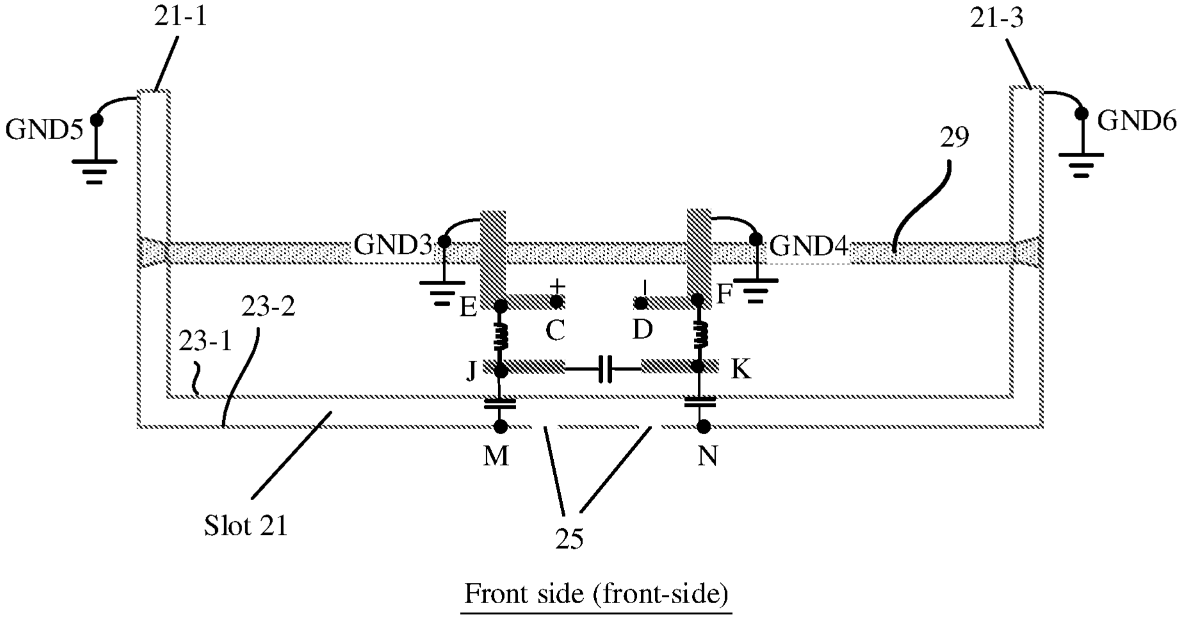
FIG. 6B is a simplified diagram of a front-side structure of an antenna apparatus according to Embodiment 1.
Figure 6C:
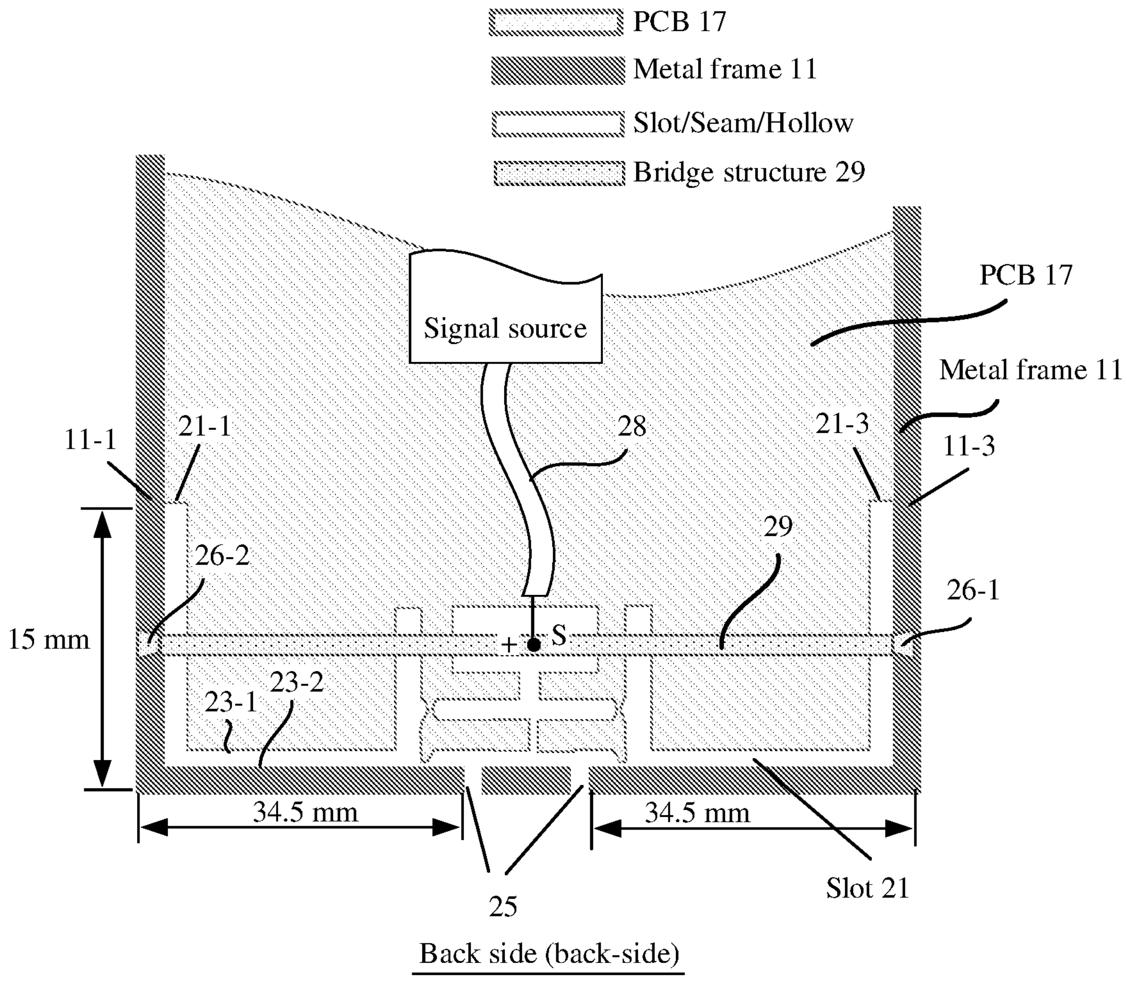
FIG. 6C is a back-side view of an antenna apparatus according to Embodiment 1.
Figure 6D:
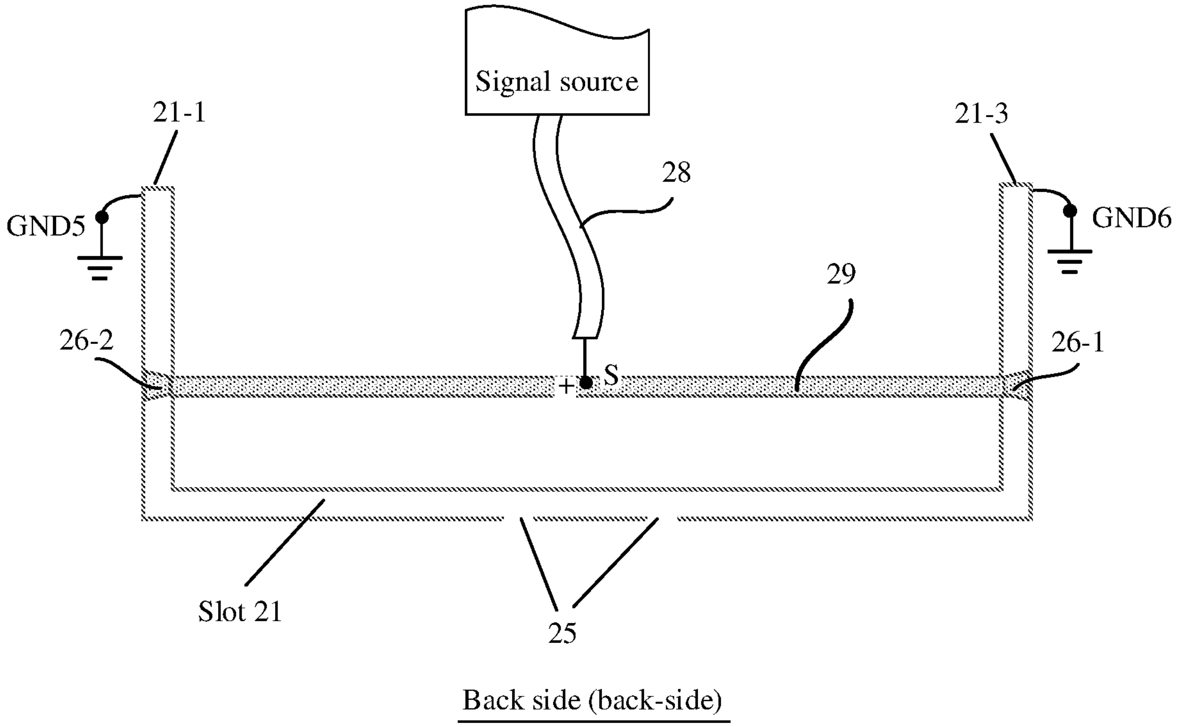
FIG. 6D is a simplified diagram of a back-side structure of an antenna apparatus according to Embodiment 1.

FIG. 6A to FIG. 6D show a MIMO antenna apparatus according to Embodiment 1. FIG. 6A is a front-side view (front-side view) of the MIMO antenna apparatus, and FIG. 6B is a simplified diagram of a front-side structure of the MIMO antenna apparatus. FIG. 6C is a back-side view (back-side view) of the MIMO antenna apparatus, and FIG. 6D is a simplified diagram of a back-side structure of the MIMO antenna apparatus. Herein, the front side is a front side of the PCB 17, and the back side is a back side of the PCB 17. The front-side view shows an anti-symmetric feeding design for the antenna structure, and the back-side view shows a symmetric feeding design for the antenna structure.

As shown in FIG. 6A to FIG. 6D, the MIMO antenna apparatus provided in Embodiment 1 may include a slot 21, a feeding point M, a feeding point N, and a bridge structure 29.

The slot 21 may be disposed between the PCB 17 and a first segment of the metal frame 11. One side edge 23-1 of the slot 21 includes one side edge 17-1 of the PCB 17, and the other side edge 23-2 includes the first segment of the metal frame 11. The first segment of the metal frame 11 may be a segment of the metal frame between a position 11-1 and a position 11-3. The side edge 23-1 may be referred to as a first side edge, and the side edge 23-2 may be referred to as a second side edge. The first segment of the metal frame 11 may be specifically a bottom edge of the metal frame, that is, the slot 21 may be disposed between the PCB 17 and the bottom edge of the metal frame. For example, as shown in FIG. 6A, the slot 21 may extend from the bottom edge of the metal frame 11 to a side edge of the metal frame 11, and may be a U-shaped slot that is located at the bottom of the electronic device 10 and that has a symmetric structure.

Two ends of the slot 21 may be grounded, and the two ends may include one end 21-1 and the other end 21-3.

A gap 25 may be disposed on the side edge 23-2 that is of the slot 21 and that is formed by using the metal frame 11. The gap 25 may connect the slot 21 to external free space. One gap 25 may be disposed on the side edge 23-2, or a plurality of gaps 25 may be disposed on the side edge 23-2.

When there is one gap 25 on the side edge 23-2, the side edge 23-2 may include two parts: a first part and a second part, where the first part is located on one side of the gap 25, and the second part is located on the other side of the gap 25.

When there may be a plurality of gaps 25 on the side edge 23-2, the plurality of gaps 25 may divide the side edge 23-2 to form a suspended segment. Specifically, when there are a plurality of gaps 25 on the side edge 23-2, the side edge 23-2 may include three parts: a first part, a second part, and a third part, where the first part is located on one side of the third part, the second part is located on the other side of the third part, and the third part may include the plurality of gaps 25 and a suspended segment between the plurality of gaps 25. For example, when there are two gaps 25 (which may be respectively referred to as a first gap and a second gap) on the side edge 23-2, the side edge 23-2 may include three parts: a first part, a second part, and a third part, where the first part is located on one side of the third part, the second part is located on the other side of the third part, and the third part may include the two gaps 25 and a suspended segment between the two gaps 25.

The gap 25 may be disposed in a middle position on the side edge, or may be disposed away from the middle position. If there are a plurality of gaps 25, that the gap 25 is disposed in a middle position on the side edge may mean that the plurality of gaps are located in the middle position on the side edge 23-2 as a whole.

The feeding point M and the feeding point N may be located on the side edge 23-2, formed by using the metal frame 11, of the slot 21, and may be specifically separately disposed on two sides of the gap 25. That is, the feeding point M is located on the first part of the side edge 23-2, and the feeding point N is located on the second part of the side edge 23-2.

Figure 7:
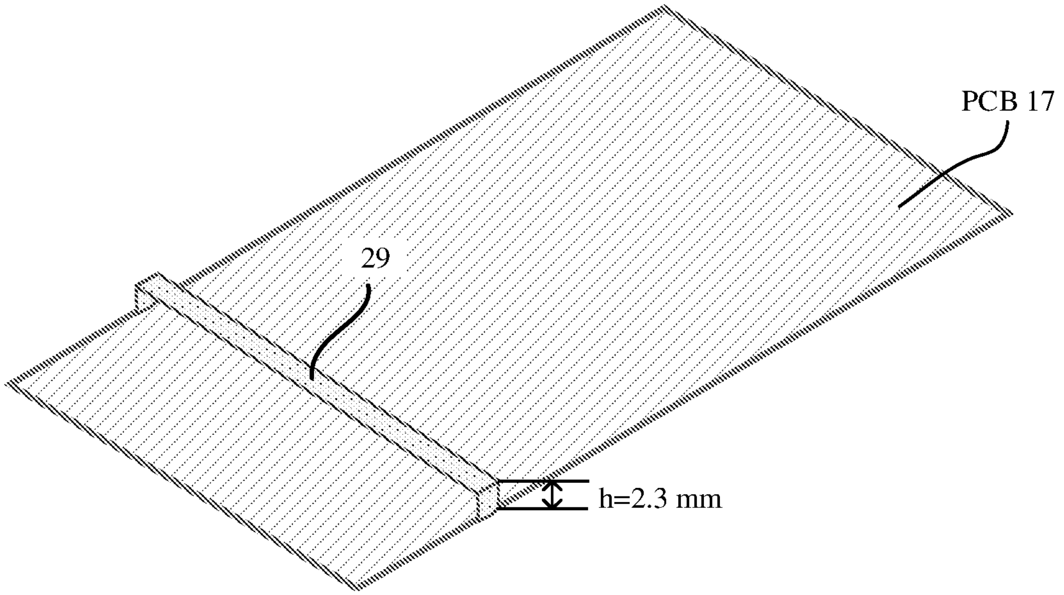
FIG. 7 is a schematic diagram in which a “bridge” structure is disposed on a PCB.

The bridge structure 29 may be a metal support formed through laser direct structuring (laser direct structuring, LDS), and may be disposed on the back side of the PCB 17. For example, as shown in FIG. 7, a height of the bridge structure 29 on the back side of the PCB 17 may be 2.3 mm. The height is not limited thereto, and the height may alternatively be another value. This is not limited in this application. The bridge structure 29 may be referred to as a "bridge" structure of slots on two sides of the gap 25, and can optimize impedance matching. Two ends of the bridge structure 29 may be connected to the slot 21, and specifically, may be respectively connected to the slots on the two sides of the gap.

The two ends of the bridge structure 29 include a first end 26-2 and a second end 26-1. The first end 26-2 may be connected to the first part of the side edge 23-2, or extend to the slot across the first side edge. The second end 26-1 may be connected to the second part of the side edge 23-2, or extend to the slot across the first side edge. When the slot 21 is a U-shaped slot extending to a side edge of the metal frame 11, the first end 26-2 and the second end 26-1 may be specifically respectively connected to two side edges of the metal frame 11.

A size of the antenna apparatus provided in Embodiment 1 may be shown in FIG. 6A or FIG. 6B, and a width of the slot 21 is 1 mm. A distance between each of closed ends (grounding ends) of the slot 21, that is, two ends extending to the side edges of the metal frame 11, and the bottom edge of the metal frame 11 is 15 mm. Widths of the two gaps disposed at the bottom of the metal frame 11 are 1 mm, and a distance between the two gaps is 8 mm. A distance from a left gap to a left side of the metal frame 11 is 34.5 mm, and a distance from a right gap to a right side of the metal frame 11 is 34.5 mm.

The antenna apparatus provided in Embodiment 1 may have two feeding structures: an anti-symmetric feeding structure and a symmetric feeding structure.

1. Anti-Symmetric Feeding Structure

The feeding point M and the feeding point N may be respectively configured to connect to a positive electrode and a negative electrode of a feed. For example, a coaxial transmission line may be used to connect to the feed. A center conductor of the coaxial transmission line (connected to the positive electrode of the feed) may be connected to the feeding point M through the transmission line, and an outer conductor (grounded) of the coaxial transmission line may be connected to the feeding point N through the transmission line. The feeding point M may also be referred to as a positive feeding point (positive feeding point), and the feeding point N may also be referred to as a negative feeding point (negative feeding point).

Figure 8:
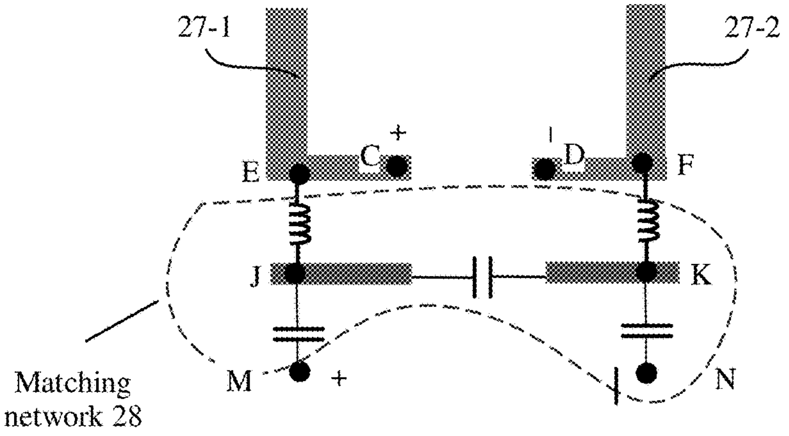
FIG. 8 is a principle diagram of an anti-symmetric feeding structure.

As shown in FIG. 6A and FIG. 6B, a feeding network connected to the feeding point M and the feeding point N may be specifically implemented by hollowing out the PCB 17, to fully utilize the PCB ground layer on the front side of the PCB 17 to implement the feeding network, so as to save design space. For example, as shown in FIG. 6A, a partial area in the center of the bottom of the PCB 17 may be hollowed out to form the feeding network of the slot antenna. Two parallel conducting wires 27-1 and 27-2 that are symmetrical from left to right extend from the PCB ground layer, and a positive electrode C and a negative electrode D of the feed are formed between the conducting wire 27-1 and the conducting wire 27-2. Connection points between the feeding network and the slot 21 are the feeding point M and the feeding point N. When a matching network is configured, the connection point is a connection point through which the feeding network is indirectly connected to the slot 21 through the matching network. An equivalent circuit of the feeding network may be shown in FIG. 8.

In addition, a matching network 28 of the feeding network may be further formed by hollowing out the PCB 17. Connection points between the matching network 28 and the feeding network are a connection point E, a connection point F, a connection point J, and a connection point K. FIG. 6A and FIG. 6B show merely an example of an implementation of a matching network, and a different matching network may alternatively be used. This is not limited in this application.

The feeding structure shown in FIG. 6A and FIG. 6B may excite the slot 21 to generate the CM slot antenna pattern. The feeding structure of anti-symmetric feeding is not limited to a form of using two parallel conducting wires (conducting wires 27-1 and 27-2), and another feeding form of the balun structure may alternatively be used. This is not limited in this application.

2. Symmetric Feeding Structure

As shown in FIG. 6C and FIG. 6D, a feeding point S may be disposed on the bridge structure 29, and the feeding point S may be connected to a feed end (positive electrode) of the feed (signal source). The bridge structure 29 shown in FIG. 6C and FIG. 6D may be connected to the slot 21. Specifically, the bridge structure 29 may be connected to the side edge 23-2, formed by using the metal frame 11, of the slot 21, and excite the slot 21 to generate the DM slot antenna pattern.

It can be learned that, according to the foregoing symmetric feeding structure and anti-symmetric feeding structure, the CM slot antenna pattern and the DM slot antenna pattern can be excited on a same slot antenna, so that characteristics such as high isolation and a low ECC of a MIMO antenna can be achieved.

Simulation of the antenna apparatus provided in Embodiment 1 is described below with reference to the accompanying drawings.

Figure 9A:
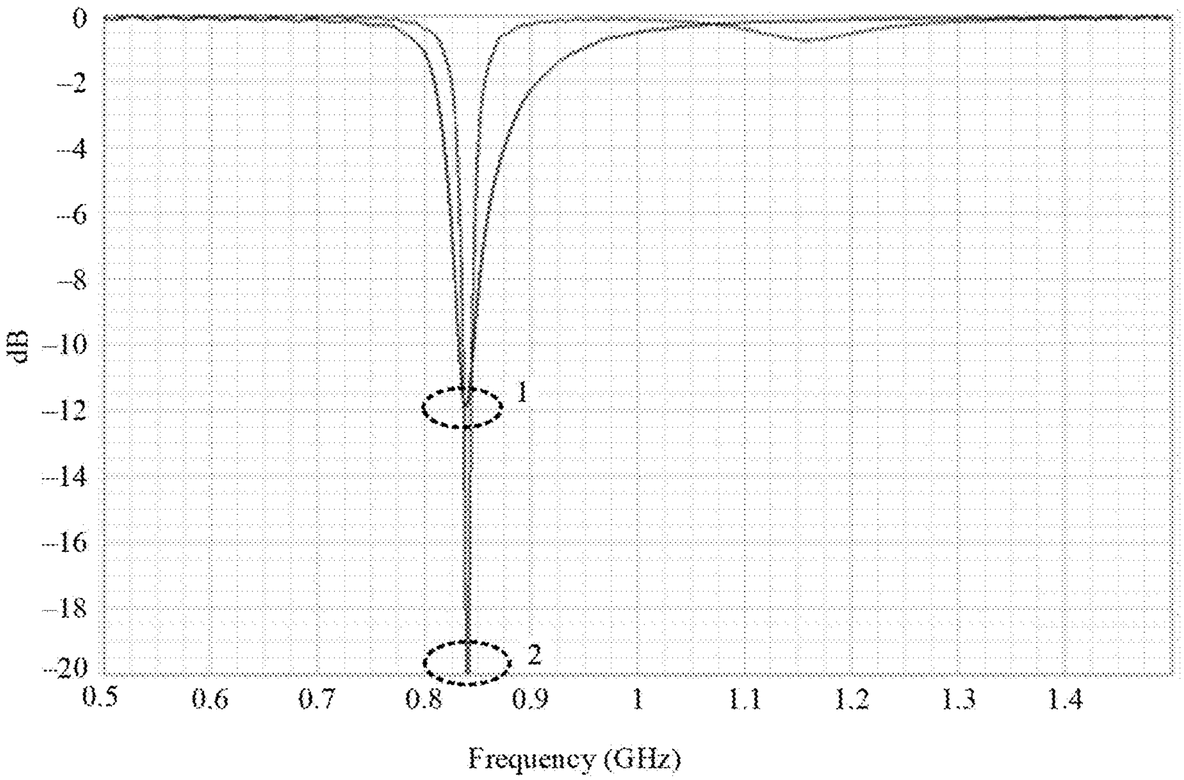
FIG. 9A is an S11 simulation diagram of an antenna apparatus according to Embodiment 1.
Figure 9B:
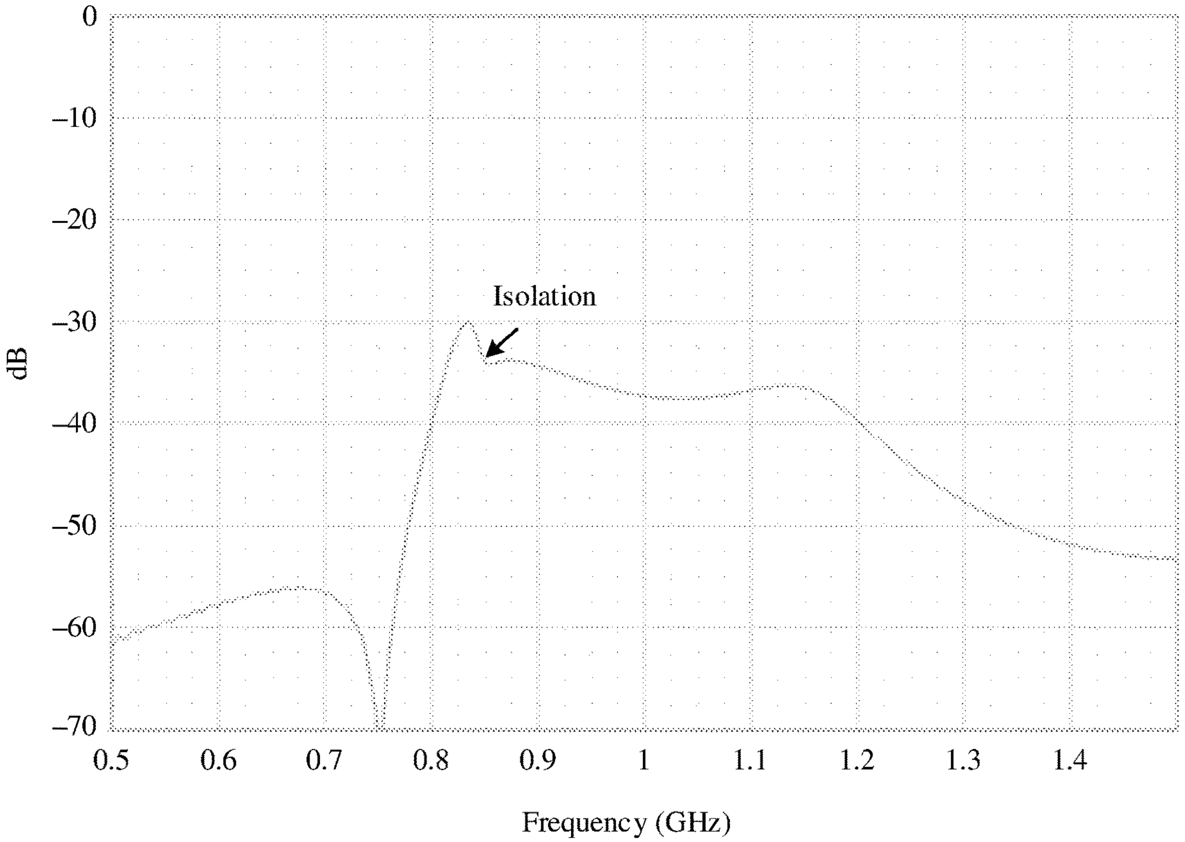
FIG. 9B is an efficiency simulation diagram of an antenna apparatus according to Embodiment 1.
Figure 9C:
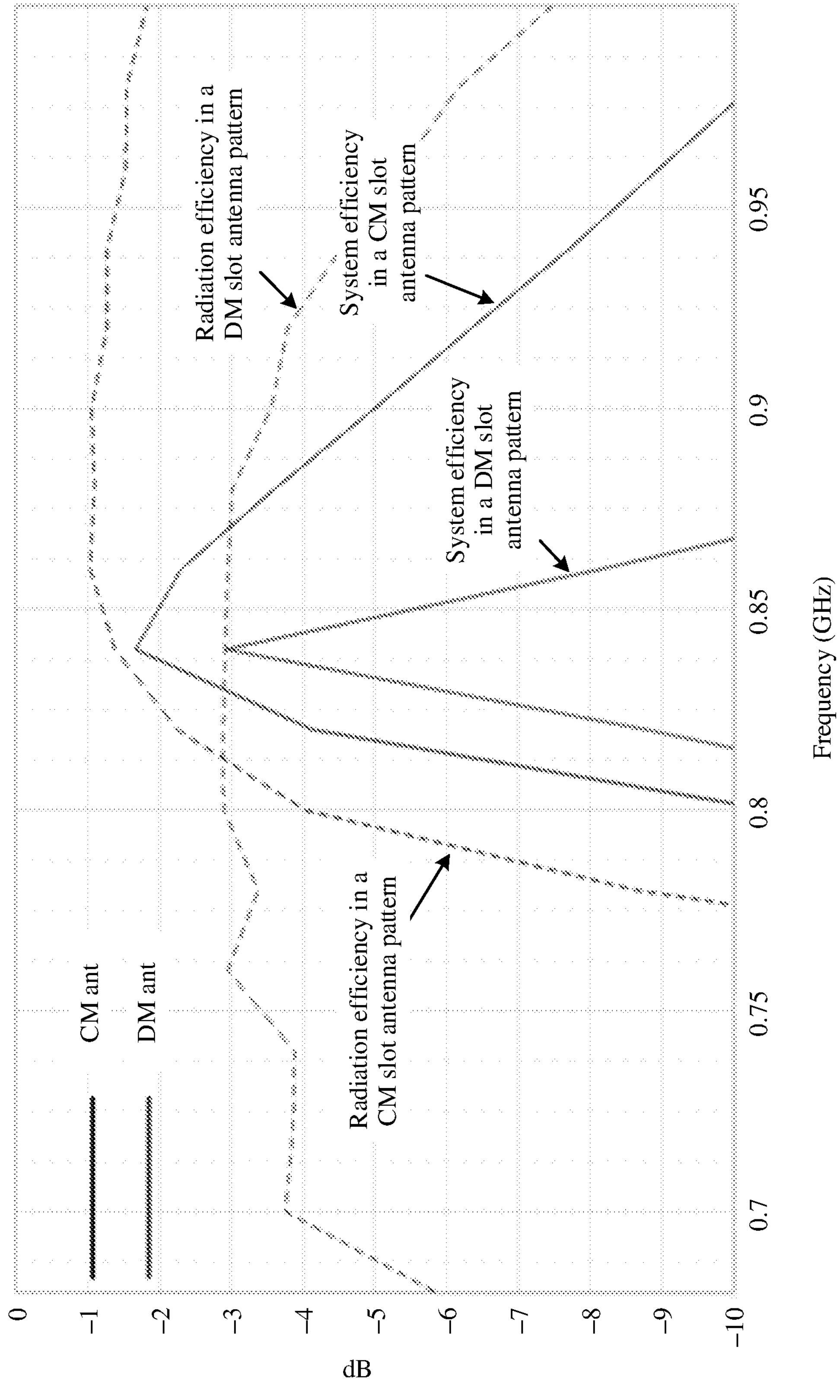
FIG. 9C is a diagram of radiation directions of an antenna apparatus according to Embodiment 1.

FIG. 9A to FIG. 9C respectively show a reflection coefficient, isolation, and antenna efficiency of the MIMO antenna apparatus.

FIG. 9A shows a group of reflection coefficient curves of the simulation of the MIMO antenna apparatus. "1" and "2" represent different resonances. The MIMO antenna apparatus may generate the resonance "1" near 0.84 GHz, and may further generate the resonance "2" near 0.84 GHz. The resonance "1" is a resonance in the CM slot antenna pattern, and the resonance "2" is a resonance in the DM slot antenna pattern. Specifically, the resonance "1" may be generated when the slots on two sides of the gap 25 each work in the ¼ wavelength mode. The resonance "2" may be generated when the entire slot 21 works in the ½ wavelength mode. A wavelength mode in which the slot 21 generates the resonance "1" is not limited, and the resonance "1" may alternatively be generated when the slots on the two sides of the gap 25 work in a ¾ wavelength mode or the like. A wavelength mode in which the slot 21 generates the resonance "2" is not limited, and the resonance "2" may alternatively be generated when the slot 21 works in a 1 wavelength mode, a 3/2 wavelength mode, or the like. In addition to the 0.84 GHz frequency band shown in FIG. 9A, the antenna apparatus provided in Embodiment 1 may further generate a resonance in another low frequency band. This may be specifically set by adjusting the size of the slot 21.

FIG. 9B shows isolation between two slot antenna patterns of the MIMO antenna apparatus. It can be learned that the isolation between the two slot antenna patterns can be up to more than 30 dB.

FIG. 9C shows radiation efficiency and system efficiency of two slot antenna patterns of the MIMO antenna apparatus. It can be learned that both of the slot antenna patterns have good radiation efficiency and system efficiency near a resonance frequency of 0.84 GHz.

Figure 10A:
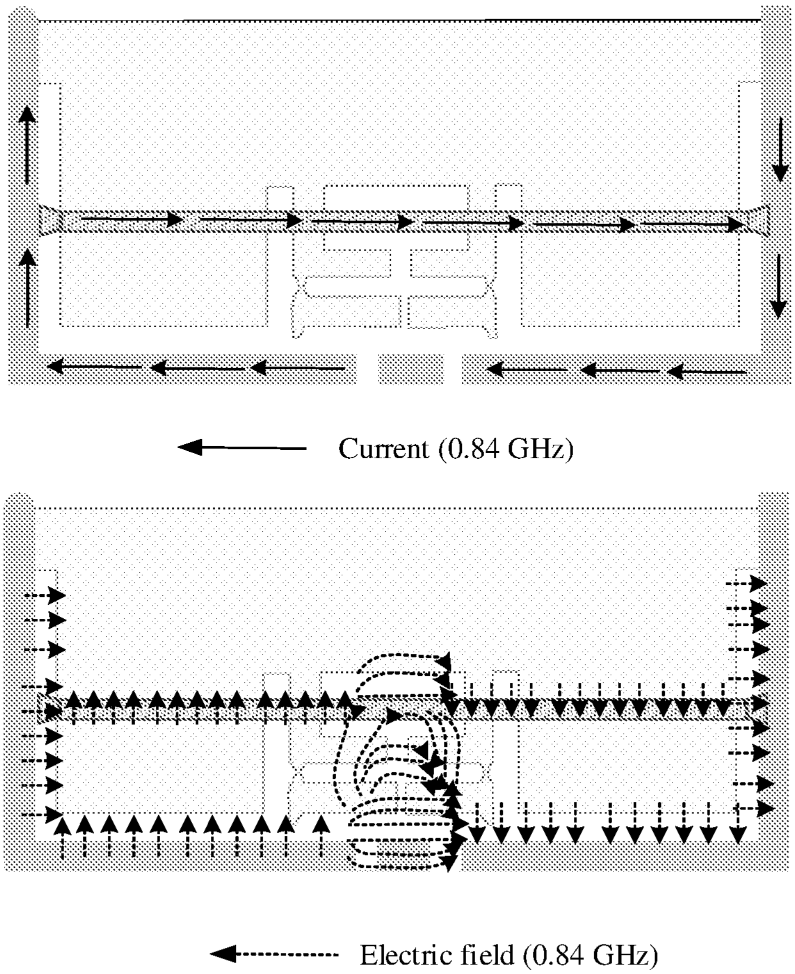
FIG. 10A is a schematic diagram of distribution of currents and electric fields of an antenna apparatus in a CM slot antenna pattern according to Embodiment 1.
Figure 10B:
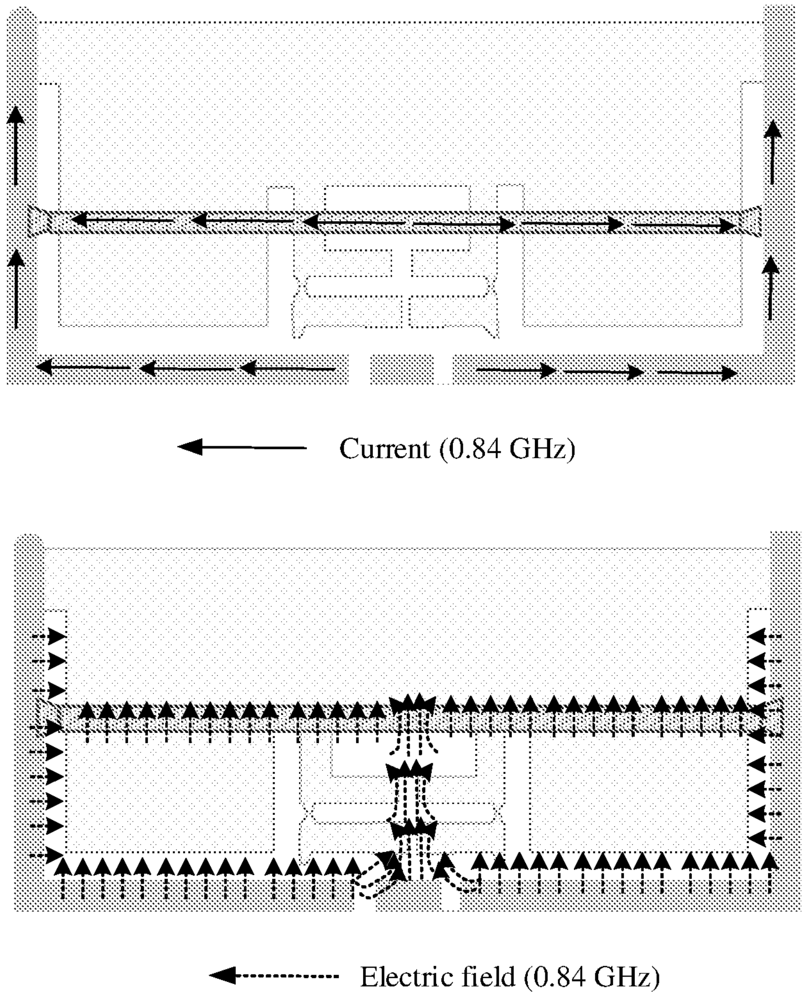
FIG. 10B is a schematic diagram of distribution of currents and electric fields of an antenna apparatus in a DM slot antenna pattern according to Embodiment 1.
Figure 11A:
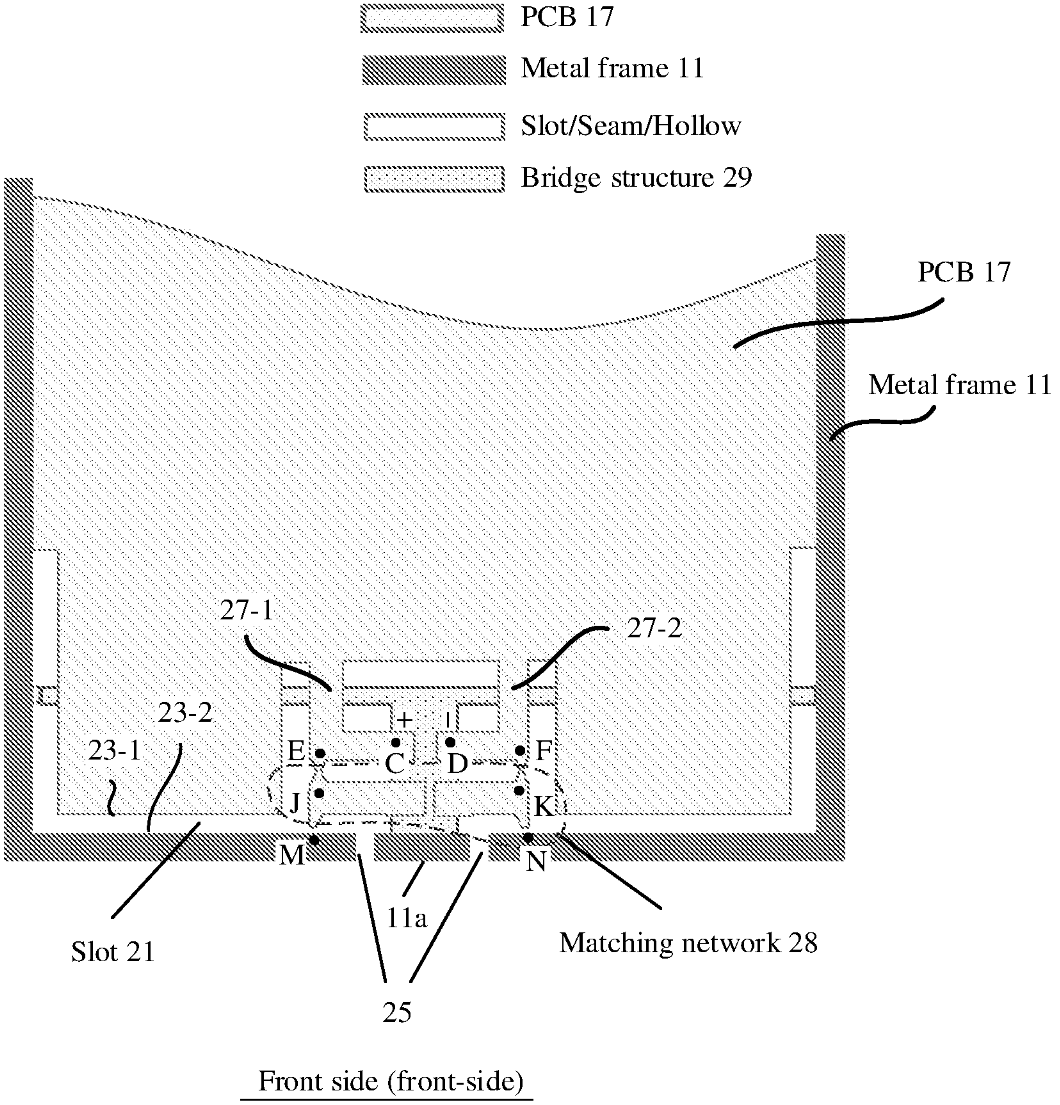
FIG. 11A is a front-side view of an antenna apparatus according to an extended solution of Embodiment 1.
Figure 11B:
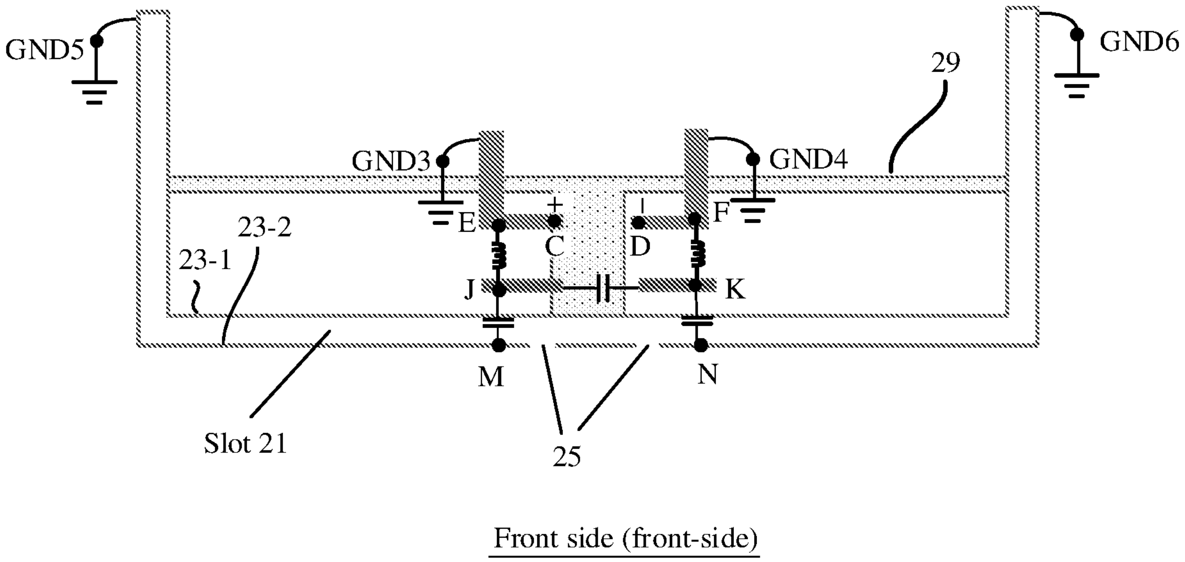
FIG. 11B is a simplified diagram of a front-side structure of an antenna apparatus according to an extended solution of Embodiment 1.
Figure 11C:
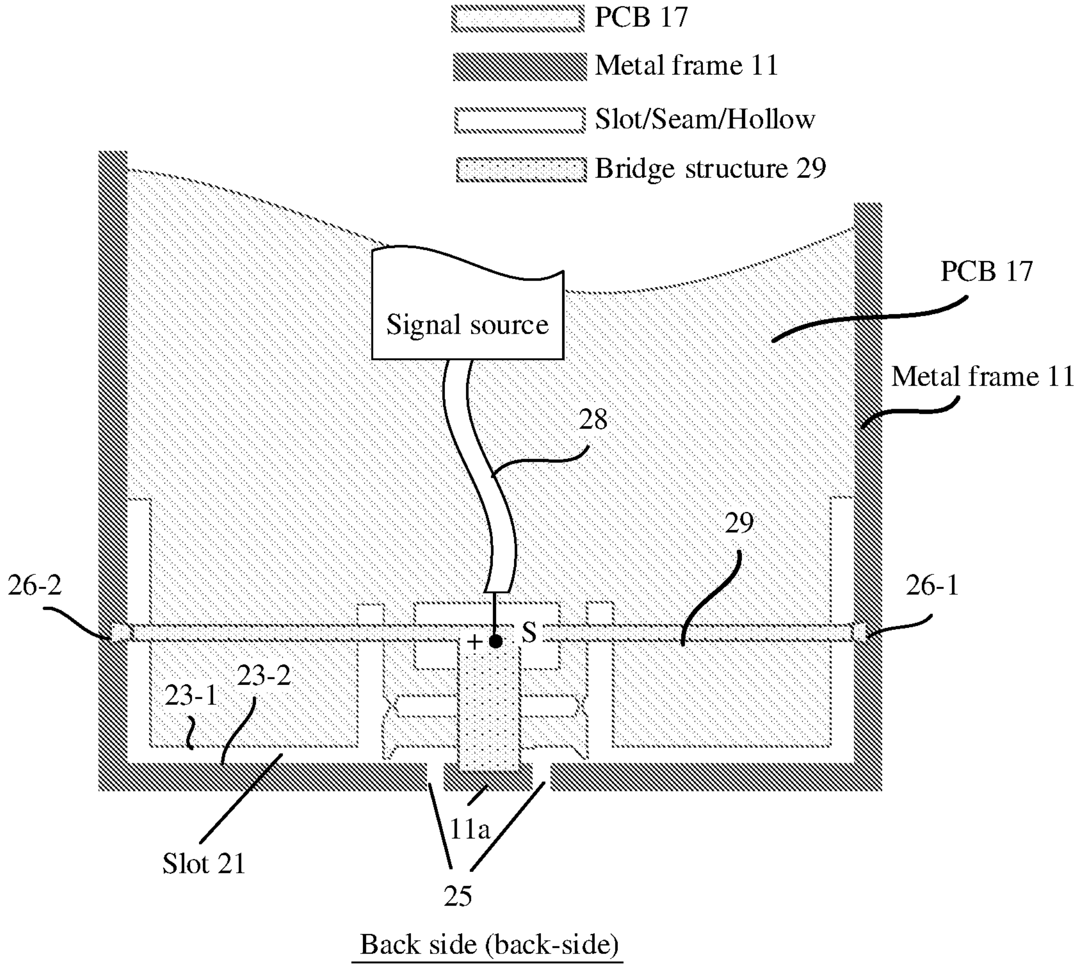
FIG. 11C is a back-side view of an antenna apparatus according to an extended solution of Embodiment 1.
Figure 11D:
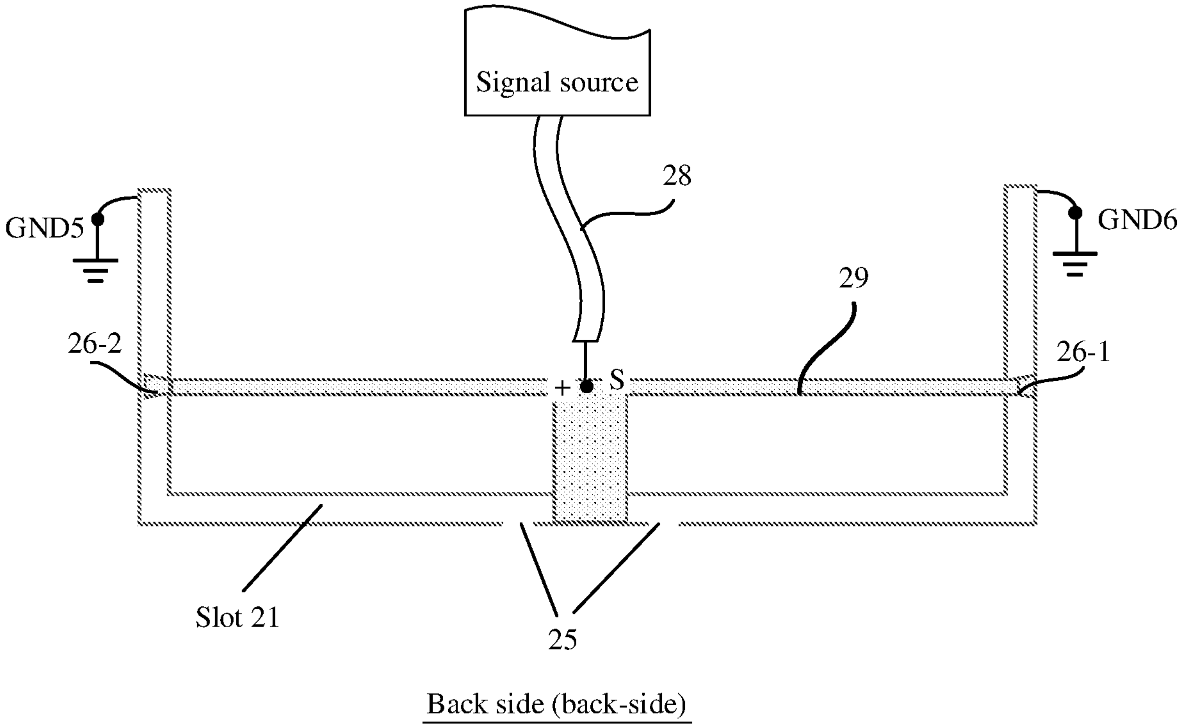
FIG. 11D is a simplified diagram of a back-side structure of an antenna apparatus according to an extended solution of Embodiment 1.

FIG. 10A and FIG. 10B show distribution of currents and electric fields of the antenna apparatus simulation provided in Embodiment 1.

FIG. 10A shows distribution of currents and electric fields of the MIMO antenna apparatus in the CM slot antenna pattern. It can be learned from FIG. 10A that the currents are distributed in a same direction on two sides of the gap 25, but the electric fields are distributed in opposite directions on two sides of the gap 25. The currents and electric fields shown in FIG. 10A may be respectively referred to as currents and electric fields in the CM slot antenna pattern. The currents and the electric fields in the CM slot antenna pattern are generated when the slots on two sides of the gap 25 each work in the ¼ wavelength mode. The currents are weak in the gap 25 of the slot 21, and are strong at both ends of the slot 21. The electric fields are strong in the gap 25 of the slot 21, and are weak at both ends of the slot 21.

FIG. 10B shows distribution of currents and electric fields of the MIMO antenna apparatus in the DM slot antenna pattern. It can be learned from FIG. 10B that the currents are distributed in opposite directions on two sides of the gap 25, but the electric fields are distributed in a same direction on two sides of the gap 25. The currents and electric fields shown in FIG. 10B may be respectively referred to as currents and electric fields in the DM slot antenna pattern. The currents and electric fields in the DM slot antenna pattern are generated when the entire slot 21 works in the ½ wavelength mode. The currents are weak in the gap 25 of the slot 21, and are strong at both ends of the slot 21. The electric fields are strong in the gap 25 of the slot 21, and are weak at both ends of the slot 21.

It can be learned that, in the antenna design solution provided in Embodiment 1, the slot is formed between the metal frame 11 and the PCB ground layer. Through symmetric feeding and anti-symmetric feeding, the slot is excited to generate two low-frequency (the operating frequency band is near LTE B5) slot antenna patterns: the CM slot antenna pattern and the DM slot antenna pattern. In this way, double resonance in the CM slot antenna pattern and the DM slot antenna pattern can be implemented, and characteristics such as high isolation and a low ECC of the MIMO antenna can be achieved in a low frequency wideband. In addition, in Embodiment 1, a form of co-feeding may be used, that is, two slot antenna patterns share a same slot antenna radiator, to save antenna design space.

Extended Solution of Embodiment 1

As shown in FIG. 11A to FIG. 11D, the bridge structure 29 may be a T-shaped structure. The bridge structure 29 is connected to the slots on the two sides of the gaps 25, and a suspended metal frame **11*a* between the gaps 25. Specifically, the T-shaped structure may include a horizontal stub and a vertical stub. Two ends (that is, a first end 26-2 and a second end 26-1) of the horizontal stub may be respectively connected to the slots on the two sides of the gaps 25. Specifically, the first end 26-2 is connected to the first part of the side edge 23-2, and the second end 26-1 may be connected to the second part of the side edge 23-2. The vertical stub may be connected to the suspended metal frame 11***a*. It is not limited to the suspended metal frame 11*a* between two gaps 25. There may alternatively be more gaps 25, to obtain more suspended metal frames through division.

In this way, a matching device in an anti-symmetric feeding structure in the CM slot antenna pattern can be adjusted, so that double resonance in the CM slot antenna pattern can be implemented. Moreover, in this variation, the "bridge" structure used in the DM slot antenna pattern can be optimized, and double resonance in the DM slot antenna pattern can also be implemented.

Simulation of the slot antenna shown in FIG. 11A to FIG. 11D is described below with reference to the accompanying drawings.

Figure 12A:
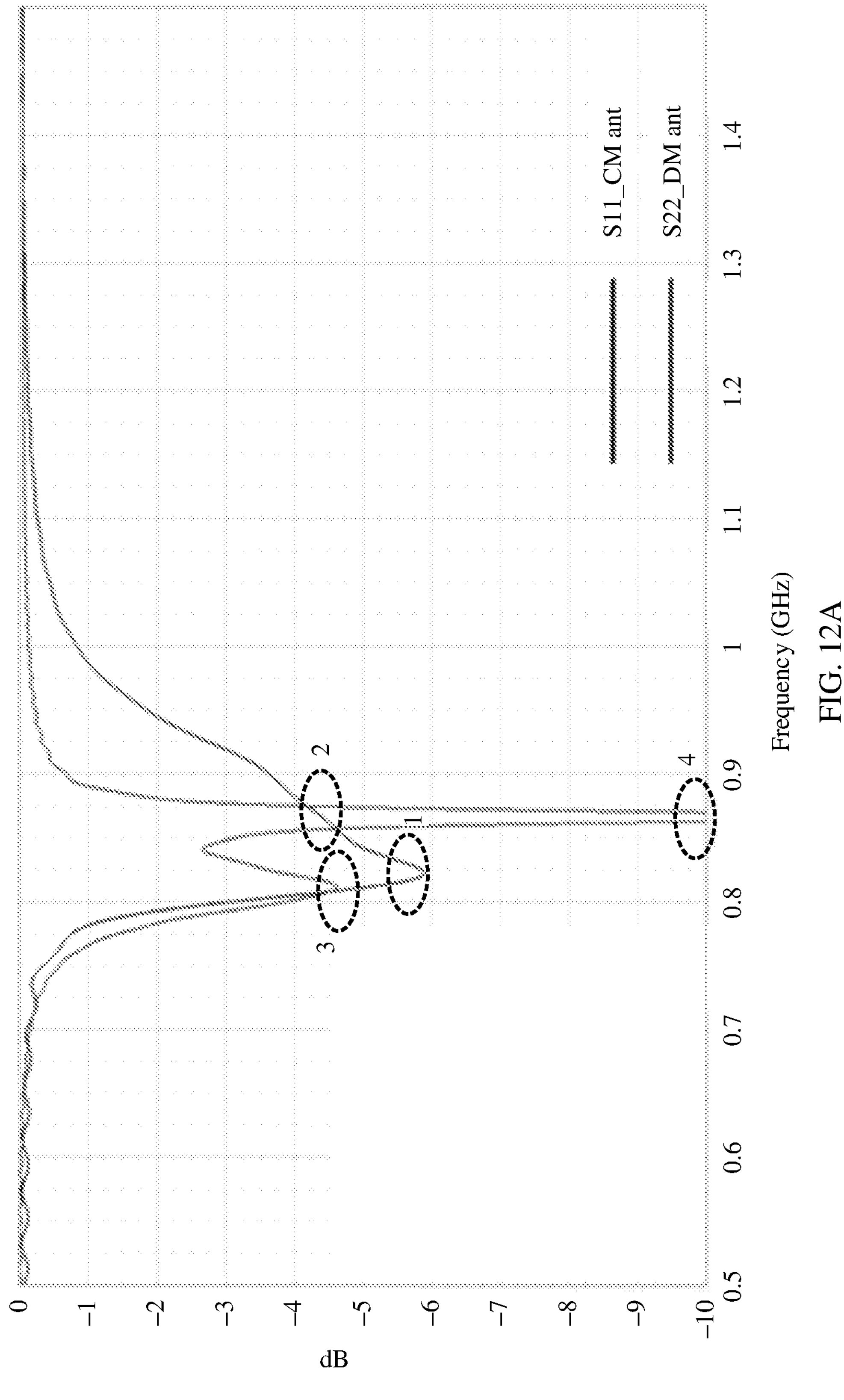
FIG. 12A is an S11 simulation diagram of an antenna apparatus according to an extended solution of Embodiment 1.
Figure 12B:
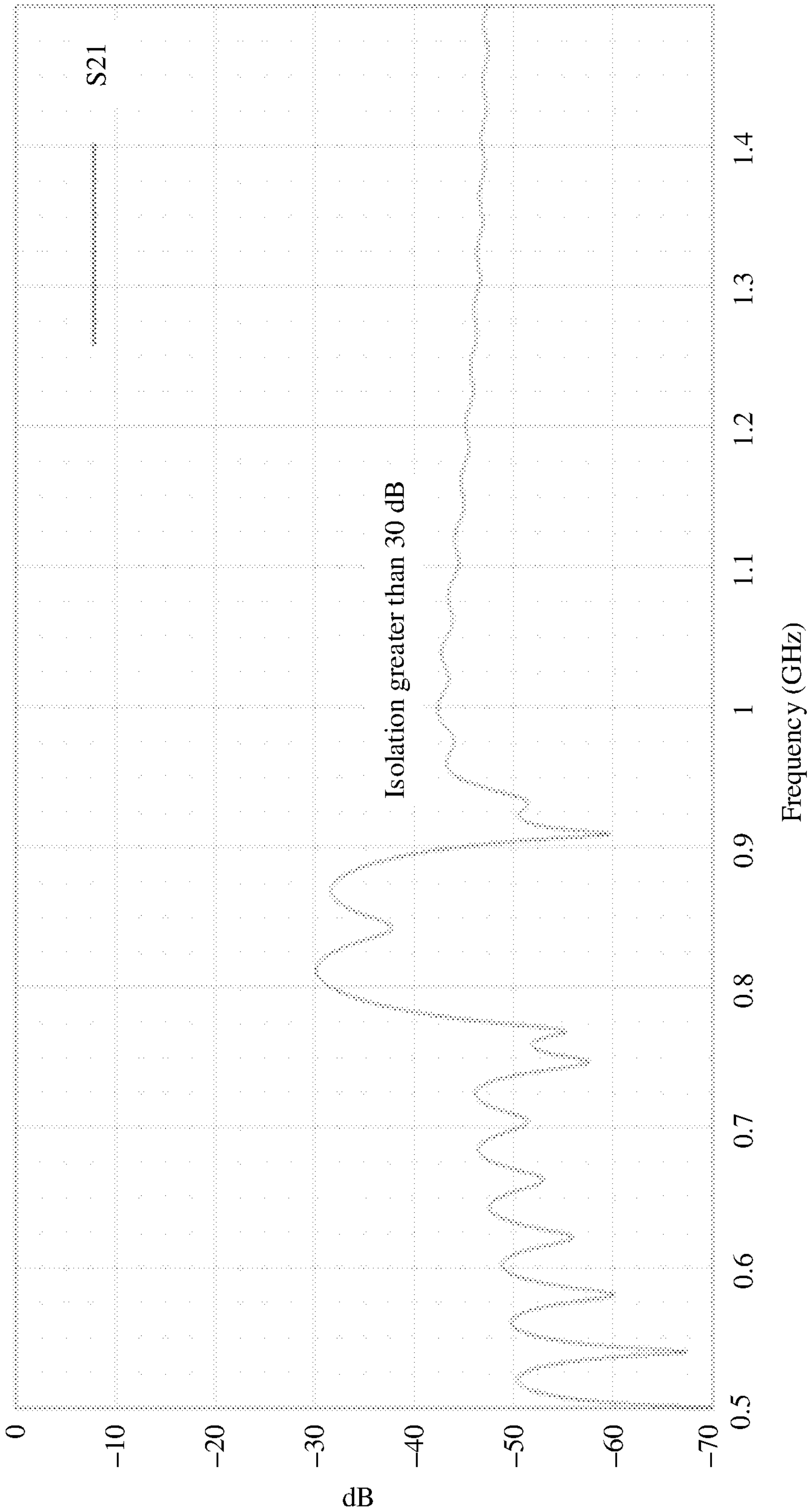
FIG. 12B is an efficiency simulation diagram of an antenna apparatus according to an extended solution of Embodiment 1.
Figure 12C:
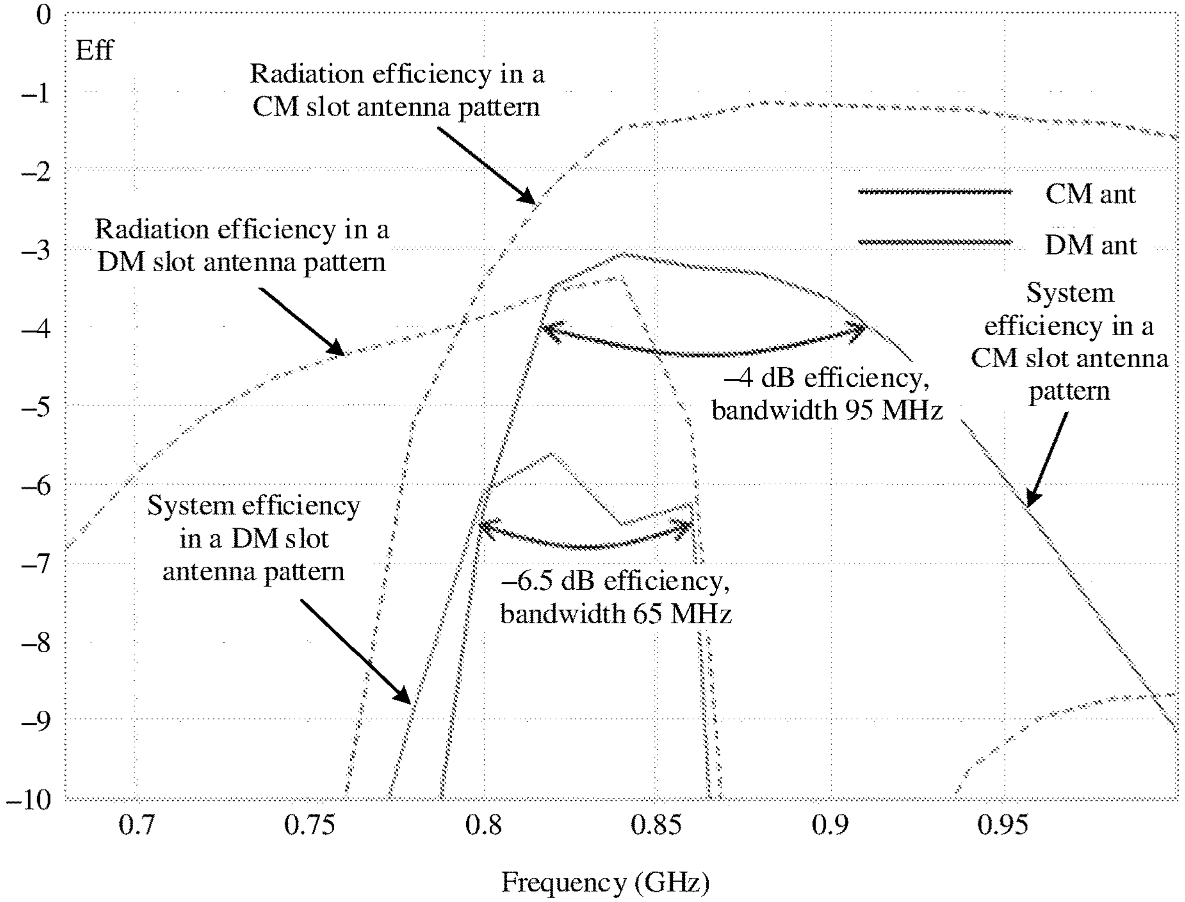
FIG. 12C is a diagram of radiation directions of an antenna apparatus according to an extended solution of Embodiment 1.

FIG. 12A to FIG. 12C respectively show reflection coefficients, isolation, and antenna efficiency of the MIMO antenna apparatus.

FIG. 12A shows a group of reflection coefficient curves of the simulation of the MIMO antenna apparatus. "1", "2", "3", and "4" represent different resonances. The MIMO antenna apparatus may generate the resonance "1" and the resonance "3" near 0.82 GHz, and may further generate the resonance "2" and the resonance "4" near 0.87 GHz. The resonance "1" and the resonance "2" are resonances in the CM slot antenna pattern, and the resonance "3" and the resonance "4" are resonances in the DM slot antenna pattern. In addition to the 0.82 GHz and 0.87 GHz frequency bands shown in FIG. 12A, the MIMO antenna apparatus may further generate double resonance in another frequency band. This may be specifically set by adjusting the size of the slot 21.

FIG. 12B shows isolation between a double resonance CM slot antenna pattern and a double resonance DM slot antenna pattern of the MIMO antenna apparatus. It can be learned that the isolation between the two slot antenna patterns can be up to more than 30 dB.

FIG. 12C shows radiation efficiency and system efficiency of two slot antenna patterns of the MIMO antenna apparatus. It can be learned that a bandwidth of the antenna apparatus shown in FIG. 11A to FIG. 11D is larger than a bandwidth of the antenna apparatus shown in FIG. 6A to FIG. 6D, and both the double resonance CM slot antenna pattern and the double resonance DM slot antenna pattern have good radiation efficiency and system efficiency.

Figure 13A:
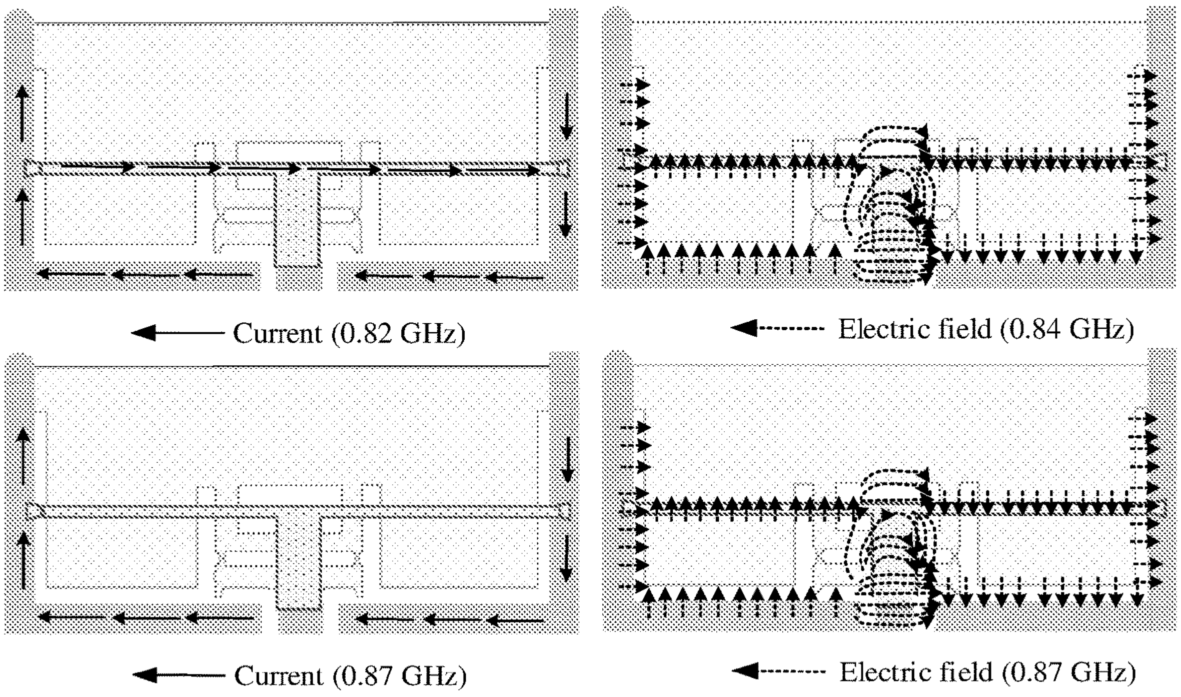
FIG. 13A is a schematic diagram of distribution of currents and electric fields of the antenna apparatus shown in FIG. 11A in a CM slot antenna pattern.
Figure 13B:
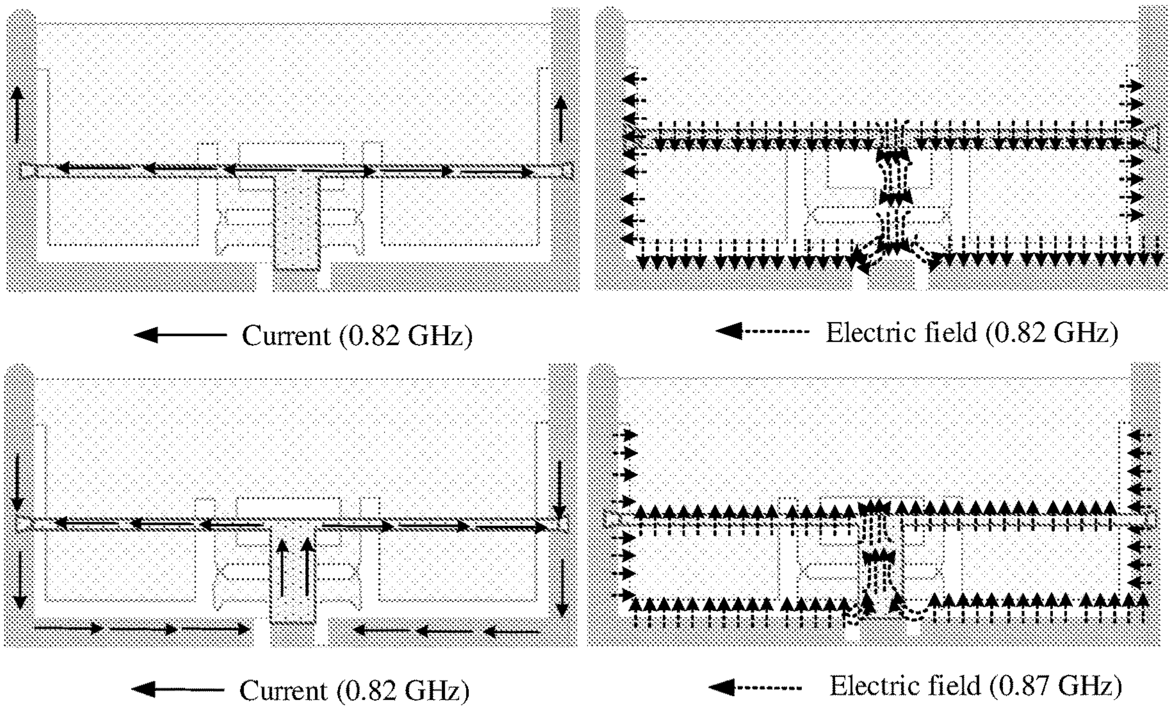
FIG. 13B is a schematic diagram of distribution of currents and electric fields of the antenna apparatus shown in FIG. 11A in a DM slot antenna pattern.

FIG. 13A and FIG. 13B show distribution of currents and electric fields of the slot antenna simulation shown in FIG. 11A to FIG. 11D.

FIG. 13A shows distribution of currents and electric fields of the MIMO antenna apparatus in the double resonance CM slot antenna pattern. As shown in FIG. 13A, the currents in the double resonance CM slot antenna pattern include a current of the resonance "1" (0.82 GHz) and a current of the resonance "2" (0.87 GHz). The electric fields in the double resonance CM slot antenna pattern include an electric field of the resonance "1" (0.82 GHz) and an electric field of the resonance "2" (0.87 GHz). It can be learned from FIG. 13A that the currents of the resonance "1" and the resonance "2" are distributed in a same direction on two sides of the gap 25, but the electric fields of the resonance "1" and the resonance "2" are distributed in opposite directions on two sides of the gap 25.

FIG. 13B shows distribution of currents and electric fields of the MIMO antenna apparatus in the double resonance DM slot antenna pattern. As shown in FIG. 13B, the currents in the double resonance CM slot antenna pattern include a current of the resonance "3" (0.82 GHz) and a current of the resonance "4" (0.87 GHz). The electric fields in the double resonance CM slot antenna pattern include an electric field of the resonance "3" (0.82 GHz) and an electric field of the resonance "4" (0.87 GHz). It can be learned from FIG. 13B that the currents of the resonance "3" and the resonance "4" are distributed in opposite directions on two sides of the gap 25, but the electric fields of the resonance "3" and the resonance "4" are distributed in a same direction on two sides of the gap 25.

Figure 14A:
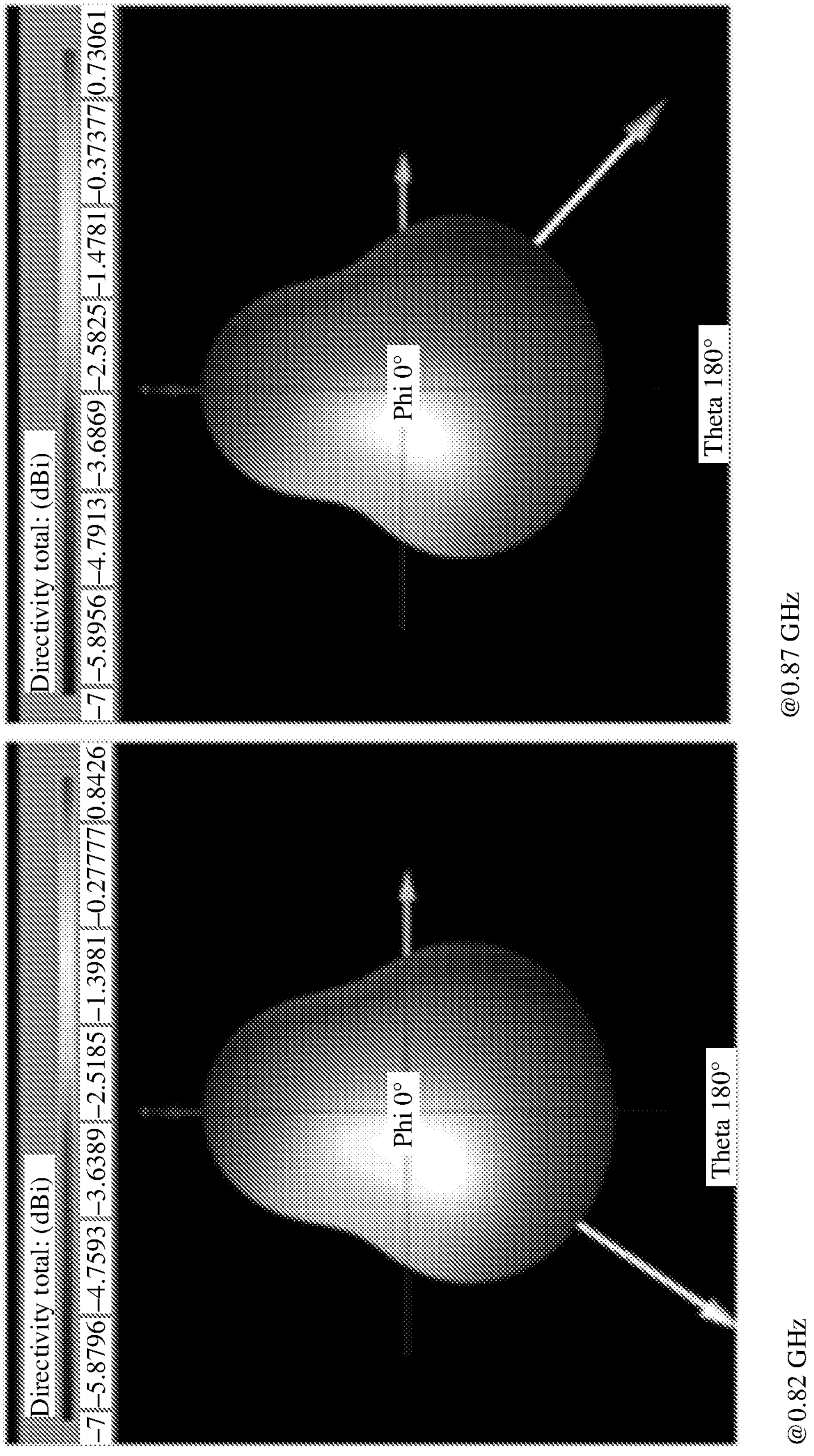
FIG. 14A and FIG. 14B are a diagram of radiation directions of the antenna apparatus shown in FIG. 11A.
Figure 14B:
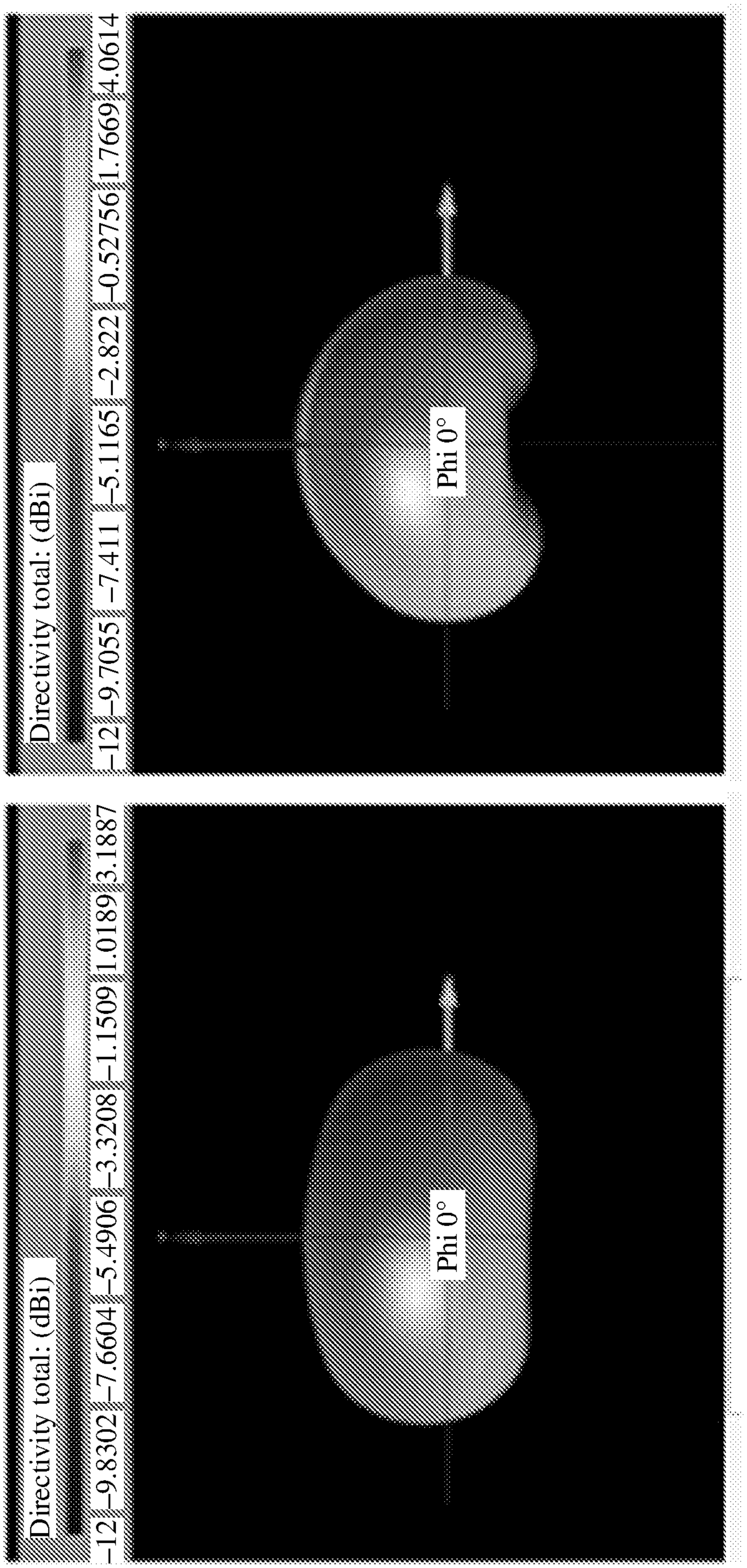

FIG. 14A and FIG. 14B are a diagram of radiation directions of the slot antenna simulation shown in FIG. 11A to FIG. 11D. An ECC is calculated according to the diagram of the radiation directions shown in FIG. 14A and FIG. 14B. An ECC of the double resonance CM slot antenna pattern and the double resonance DM slot antenna pattern is as low as 0.01 in the resonance "1" (0.82 GHz), and an ECC of the double resonance CM slot antenna pattern and the double resonance DM slot antenna pattern is as low as 0.03 in the resonance "2" (0.87 GHz).

It can be learned that in the slot antenna shown in FIG. 11A to FIG. 11D, the double resonance CM slot antenna pattern and the double resonance DM slot antenna pattern can be implemented by deforming the bridge structure 29, to further increase a frequency bandwidth, and achieve high isolation and a low ECC.

Embodiment 2

A MIMO antenna apparatus provided in this embodiment may excite, through symmetric feeding and anti-symmetric feeding, a slot to generate two medium- and high-frequency (an operating frequency band is near Wi-Fi 2.4 GHz) slot antenna patterns: a CM slot antenna pattern and a DM slot antenna pattern.

Figure 15A:
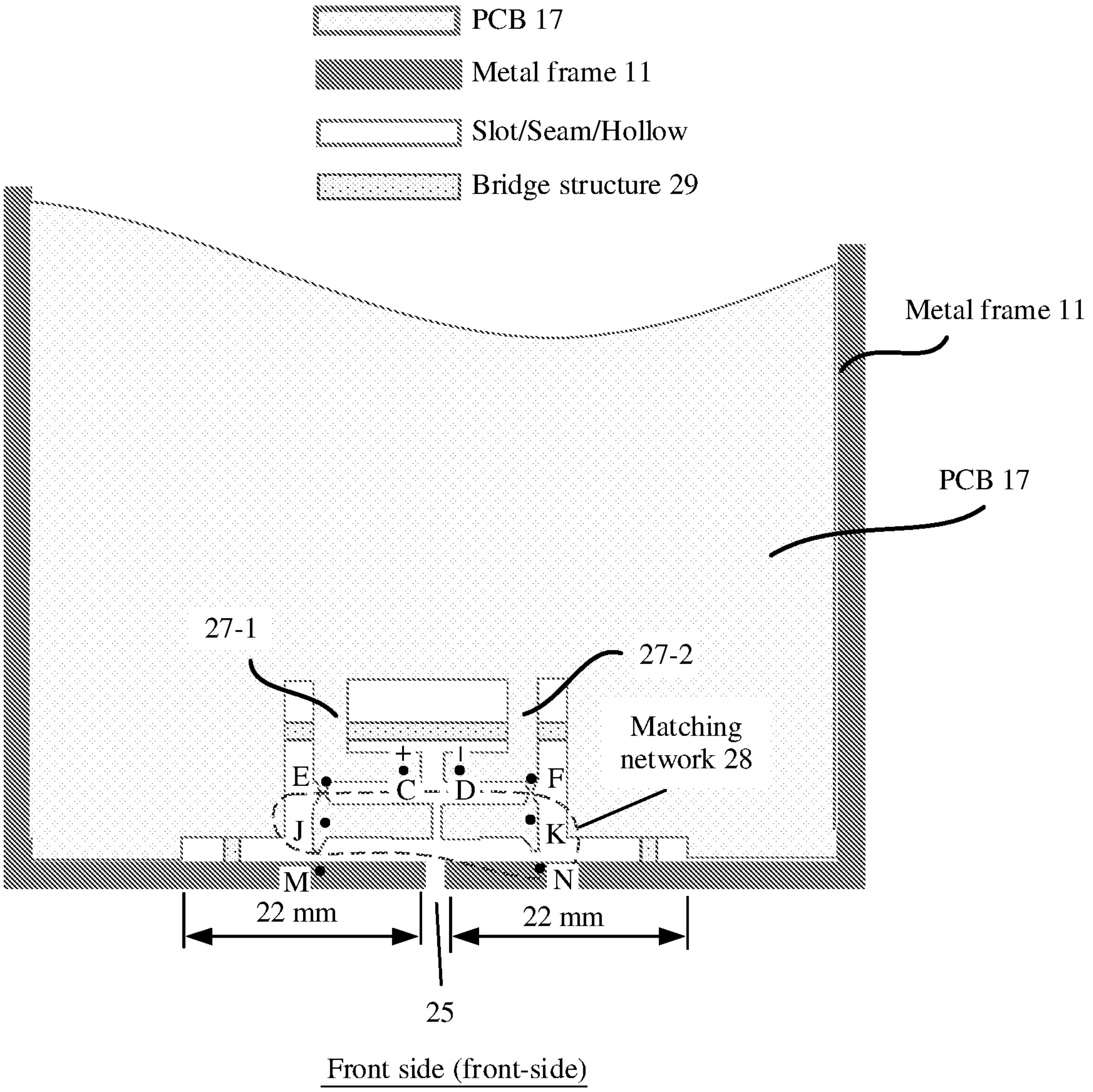
FIG. 15A is a front-side view of an antenna apparatus according to Embodiment 2.
Figure 15B:
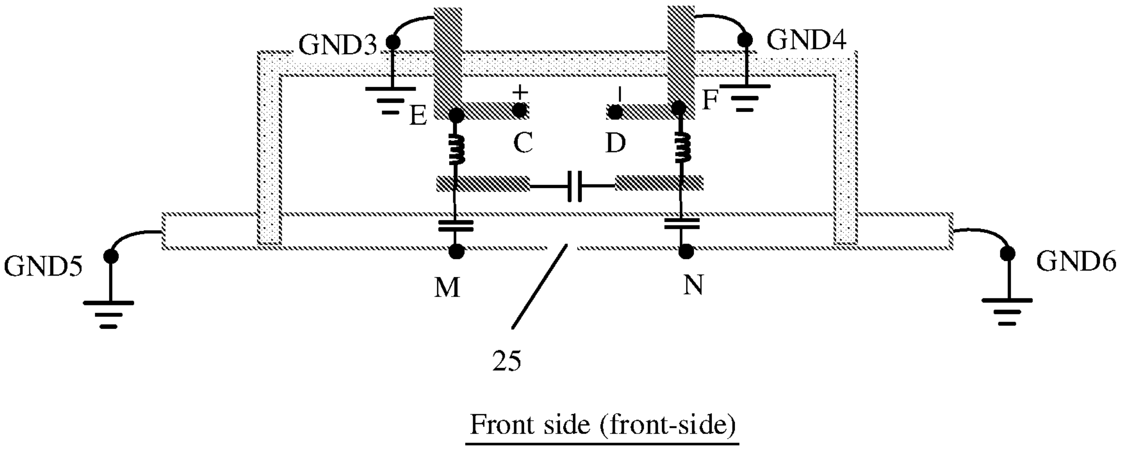
FIG. 15B is a simplified diagram of a front-side structure of an antenna apparatus according to Embodiment 2.
Figure 15C:
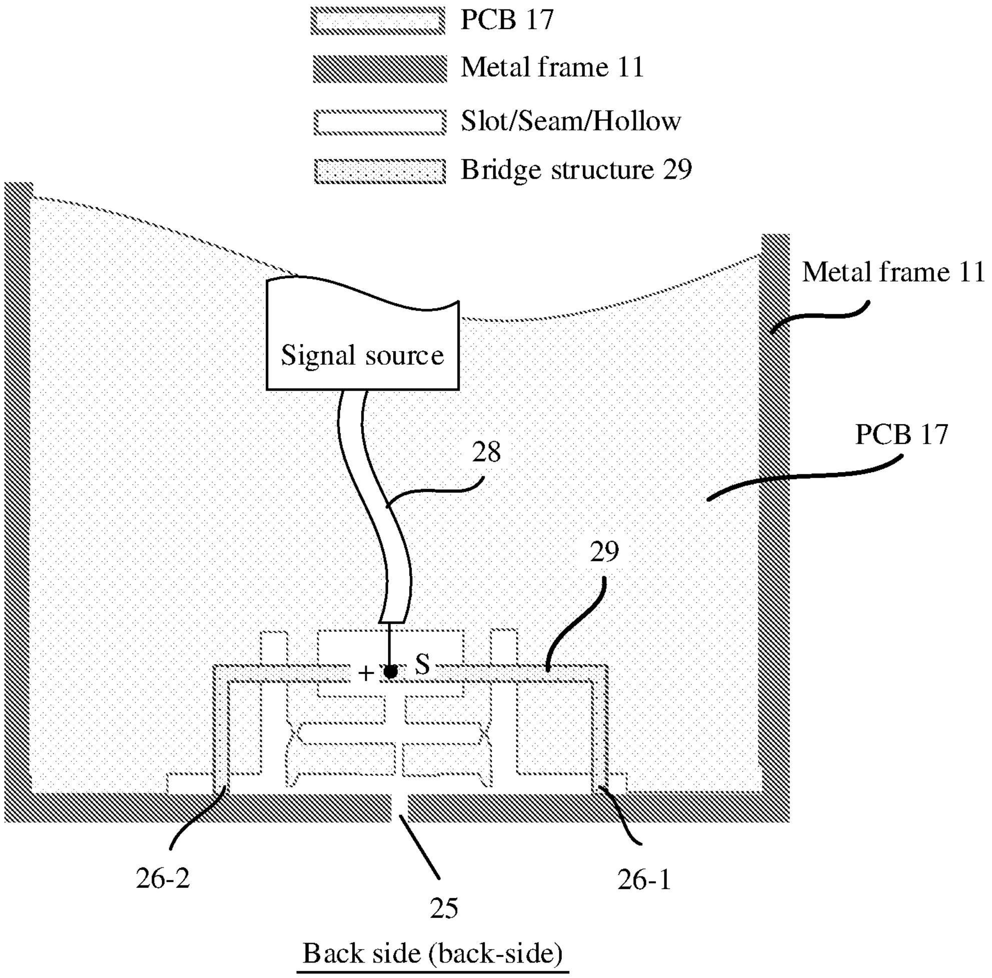
FIG. 15C is a back-side view of an antenna apparatus according to Embodiment 2.
Figure 15D:
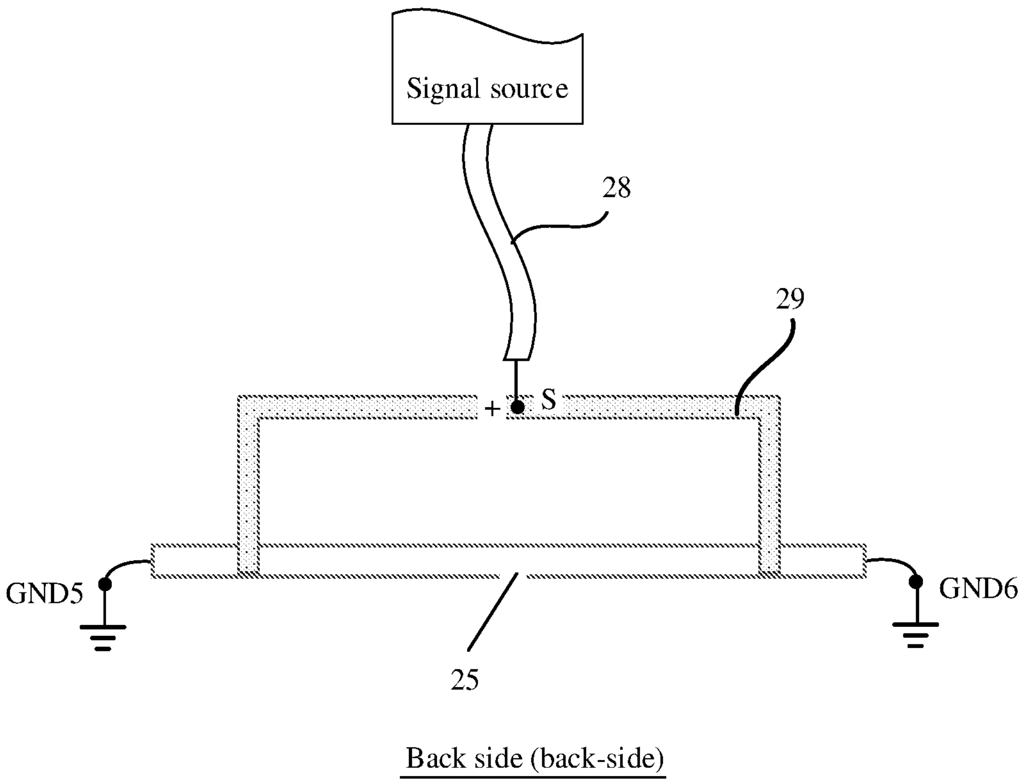
FIG. 15D is a simplified diagram of a back-side structure of an antenna apparatus according to Embodiment 2.

FIG. 15A to FIG. 15D show the MIMO antenna apparatus according to Embodiment 2. FIG. 15A is a front-side view (front-side view) of the MIMO antenna apparatus, and FIG. 15B is a simplified diagram of a front-side structure of the MIMO antenna apparatus. FIG. 15C is a back-side view (back-side view) of the MIMO antenna apparatus, and FIG. 15D is a simplified diagram of a back-side structure of the MIMO antenna apparatus. Herein, the front side is a front side of a PCB 17, and the back side is a back side of the PCB 17. The front-side view shows an anti-symmetric feeding design for the antenna structure, and the back-side view shows a symmetric feeding design for the antenna structure.

As shown in FIG. 15A to FIG. 15D, the MIMO antenna apparatus provided in Embodiment 2 may include a slot 21, a feeding point M, a feeding point N, and a bridge structure 29.

The slot 21 may be disposed between the PCB 17 and a first segment of a metal frame 11. Different from that in Embodiment 1, the slot 21 in Embodiment 2 is shorter, to form a slot radiator of a smaller size and generate medium- and high-frequency resonance. A length of the slot 21 may be less than a first length (for example, 50 mm). For example, as shown in FIG. 15A, the slot 21 may be a strip-shaped slot located at the bottom of the electronic device 10, and the length of the slot 21 is 46 mm.

A gap 25 may be disposed on a side edge 23-2 that is of the slot 21 and that is formed by using the metal frame 11. One gap 25 may be disposed on the side edge 23-2, or a plurality of gaps 25 may be disposed on the side edge 23-2. For example, as shown in FIG. 15A, there may be one gap 25. The gap 25 may be disposed in a middle position on the side edge, or may be disposed away from the middle position.

The feeding point M and the feeding point N may be located on the side edge 23-2, formed by using the metal frame 11, of the slot 21, and may be specifically separately disposed on two sides of the gap 25. That is, the feeding point M is located on a first part of the side edge 23-2, and the feeding point N is located on a second part of the side edge 23-2.

Different from that in Embodiment 1, the bridge structure 29 in Embodiment 2 may be a U-shaped structure, and two ends of the bridge structure 29 may be respectively connected to slots on two sides of the gap 25. A first end 26-1 and a second end 26-2 of the bridge structure 29 may be specifically connected to a bottom edge of the metal frame 11.

A size of the antenna apparatus provided in Embodiment 2 may be shown in FIG. 15A or FIG. 15B, and a width of the slot 21 is 1 mm. A width of one gap 25 provided at the bottom of the metal frame 11 is 2 mm, and lengths of slots on two sides of the gap 25 are both 22 mm.

An anti-symmetric feeding structure and a symmetric feeding structure that are the same as those described in Embodiment 1 may be used in Embodiment 2. For details, refer to Embodiment 1. Details are not described herein again.

Same as that in Embodiment 1, there may also be two gaps 25 in Embodiment 2 gap. The bridge structure 29 may alternatively be the bridge structure 29 described in the extended solution of Embodiment 1.

Simulation of the antenna apparatus provided in Embodiment 2 is described below with reference to the accompanying drawings.

Figure 16A:
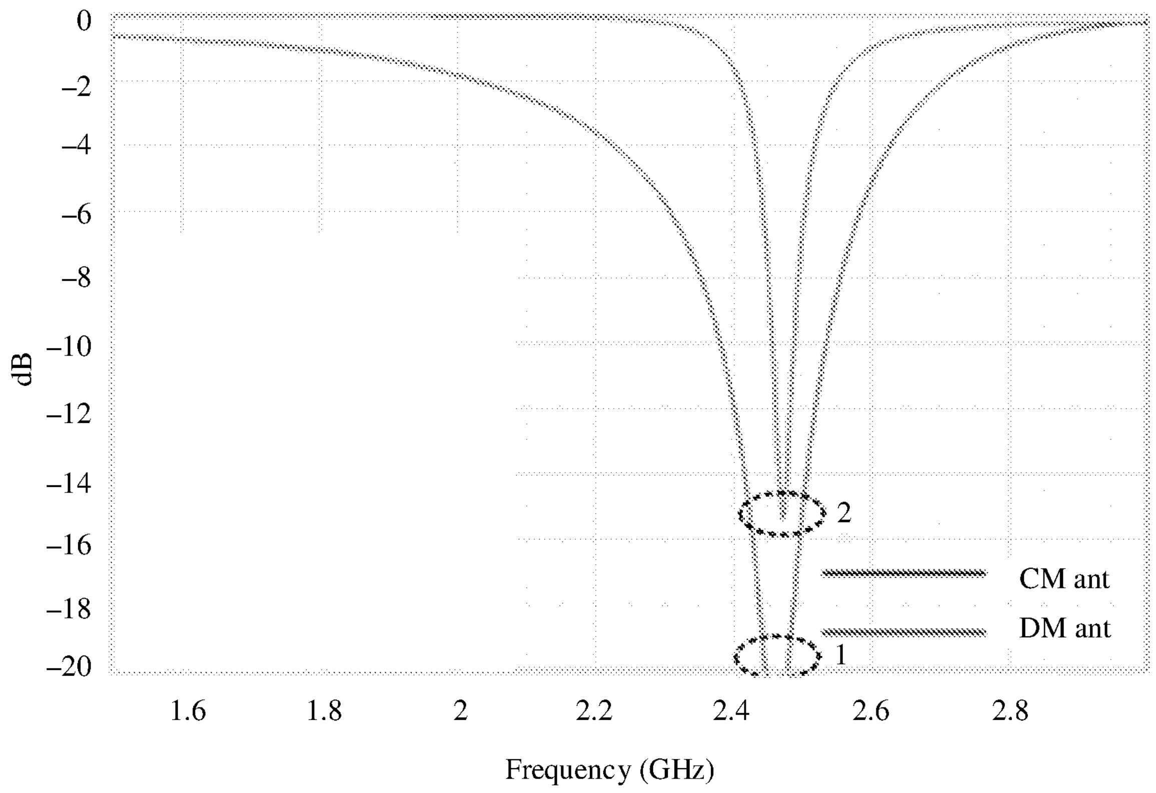
FIG. 16A is an S11 simulation diagram of an antenna apparatus according to Embodiment 2.
Figure 16B:
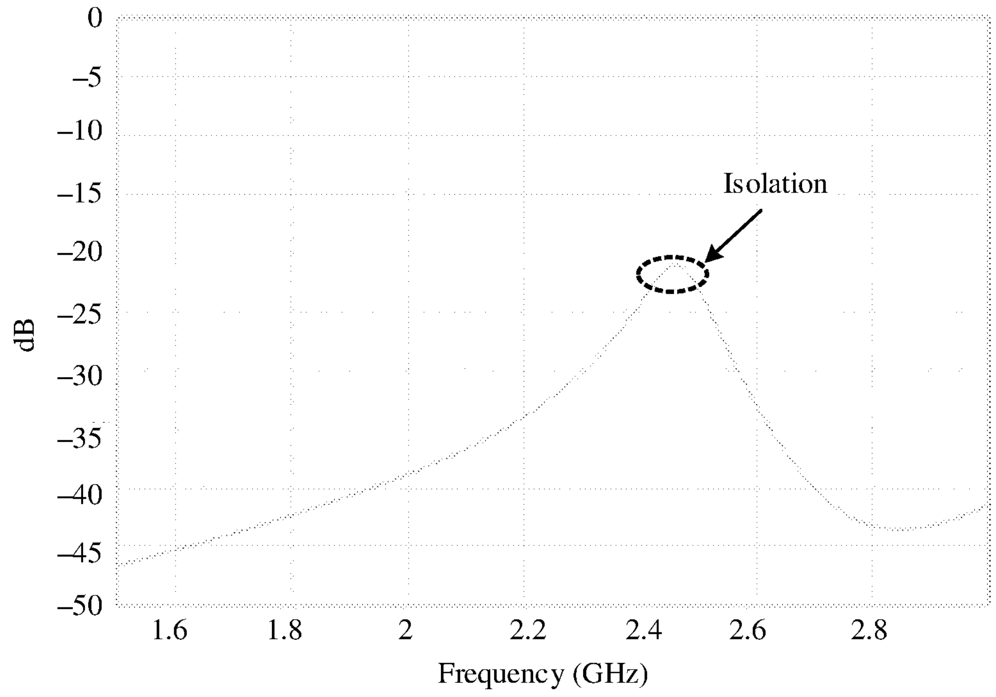
FIG. 16B is an efficiency simulation diagram of an antenna apparatus according to Embodiment 2.
Figure 16C:
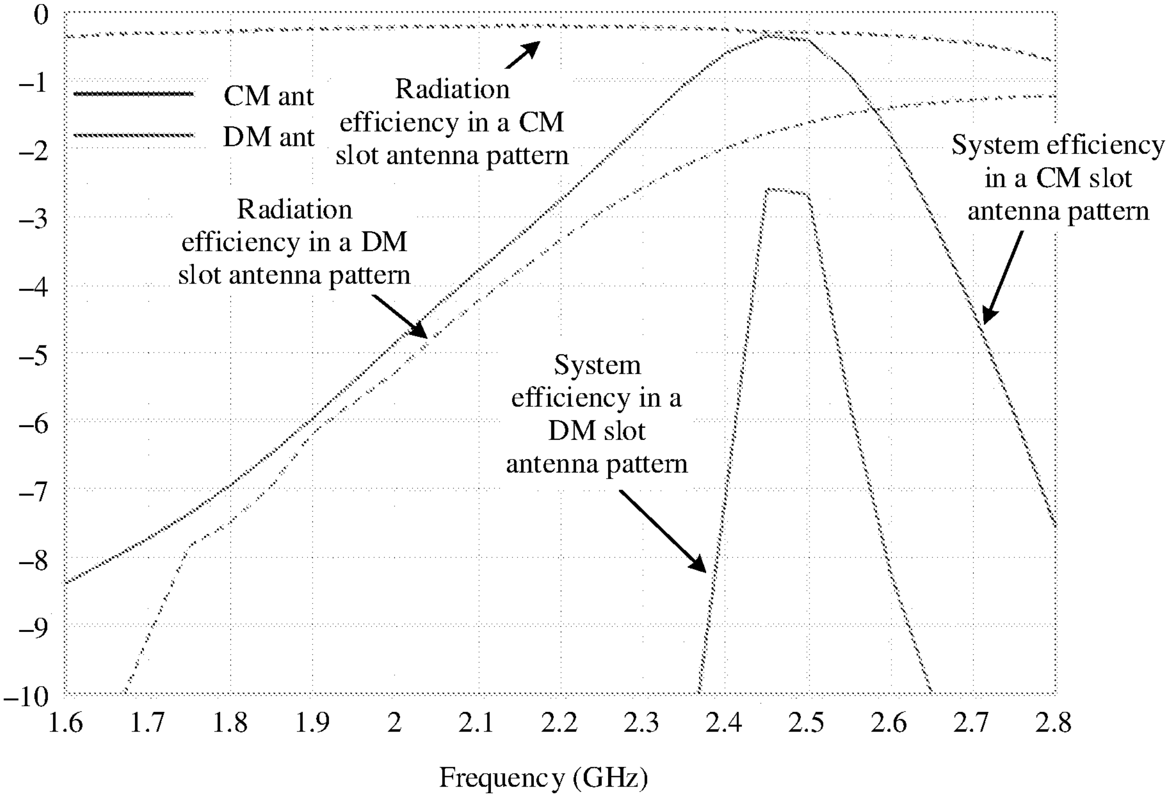
FIG. 16C is a diagram of radiation directions of an antenna apparatus according to Embodiment 2.

FIG. 16A to FIG. 16C respectively show a reflection coefficient, isolation, and antenna efficiency of the MIMO antenna apparatus.

FIG. 16A shows a group of reflection coefficient curves of the simulation of the MIMO antenna apparatus. “1” and “2” represent different resonances. The MIMO antenna apparatus may generate the resonance “1” near 2.47 GHz, and may further generate the resonance “2” near 2.47 GHz. The resonance “1” is a resonance in the CM slot antenna pattern, and the resonance “2” is a resonance in the DM slot antenna pattern. Specifically, the resonance “1” may be generated when the slots on two sides of the gap 25 each work in the ¼ wavelength mode. The resonance “2” may be generated when the entire slot 21 works in the ½ wavelength mode. A wavelength mode in which the slot 21 generates the resonance “1” is not limited, and the resonance “1” may alternatively be generated when the slots on the two sides of the gap 25 work in a ¾ wavelength mode or the like. A wavelength mode in which the slot 21 generates the resonance “2” is not limited, and the resonance “2” may alternatively be generated when the slot 21 works in a 1 wavelength mode, a 3/2 wavelength mode, or the like. In addition to the 2.47 GHz frequency band shown in FIG. 16A, the antenna apparatus provided in Embodiment 2 may further generate a resonance in another medium and high frequency band. This may be specifically set by adjusting the size of the slot 21.

FIG. 16B shows isolation between two slot antenna patterns of the MIMO antenna apparatus. It can be learned that the isolation between the two slot antenna patterns can be up to more than 21 dB.

FIG. 16C shows radiation efficiency and system efficiency of two slot antenna patterns of the MIMO antenna apparatus. It can be learned that both of the slot antenna patterns have good radiation efficiency and system efficiency near a resonance frequency of 2.47 GHz.

Figure 17A:
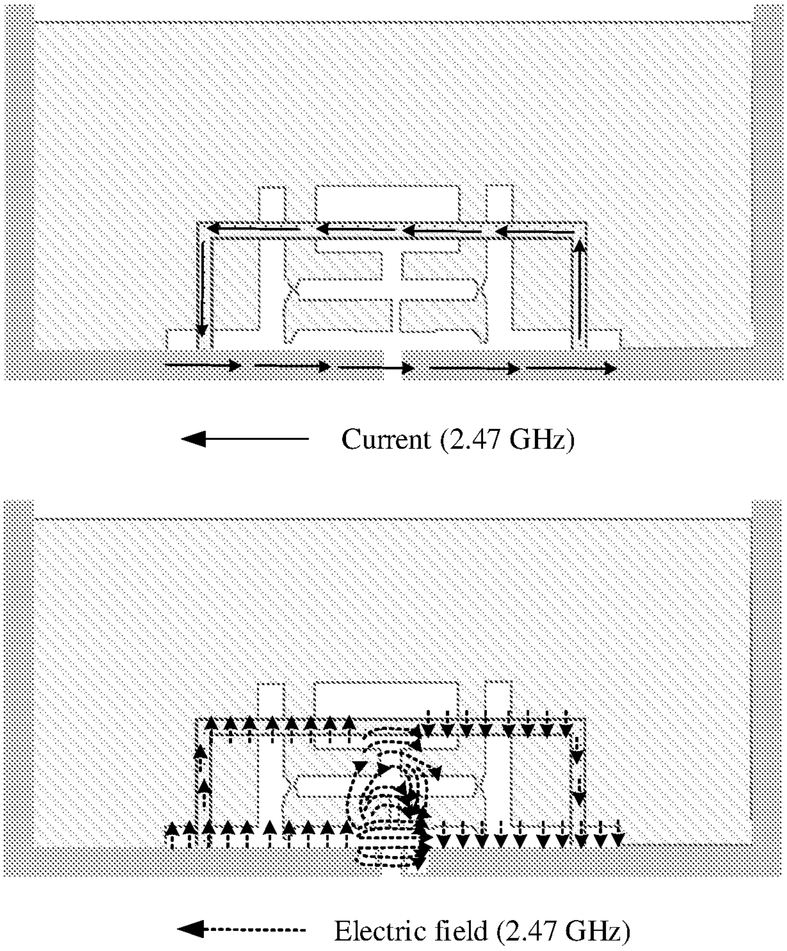
FIG. 17A is a schematic diagram of distribution of currents and electric fields of an antenna apparatus in a CM slot antenna pattern according to Embodiment 2.
Figure 17B:
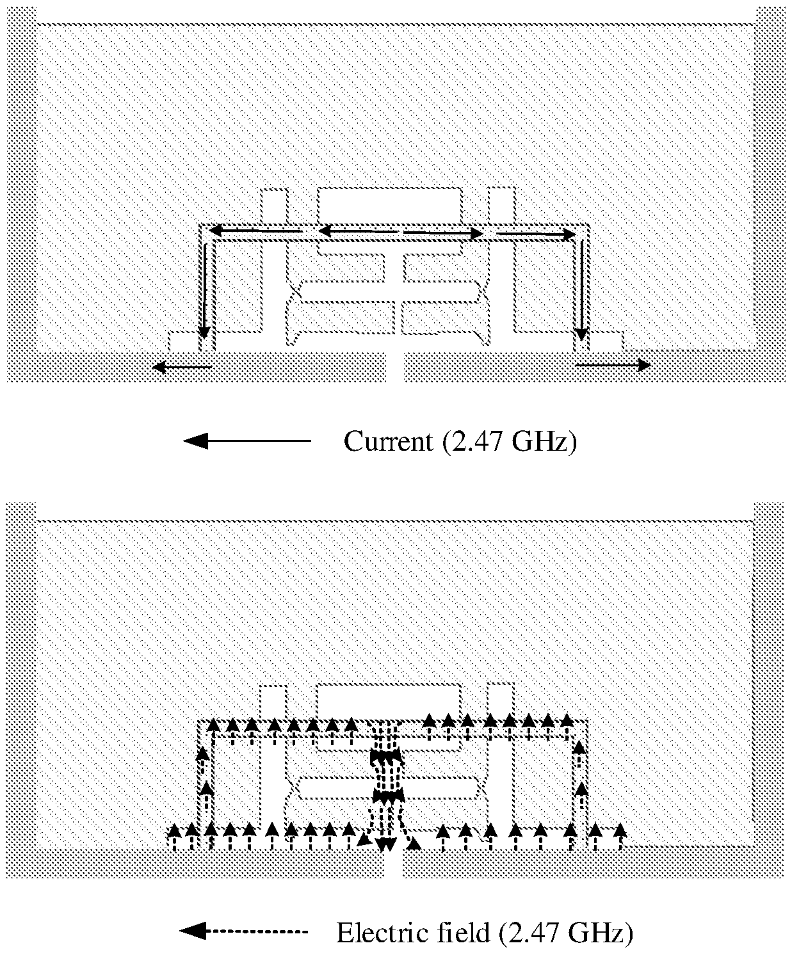
FIG. 17B is a schematic diagram of distribution of currents and electric fields of an antenna apparatus in a DM slot antenna pattern according to Embodiment 2.

FIG. 17A and FIG. 17B show distribution of currents and electric fields of the antenna apparatus simulation provided in Embodiment 2.

FIG. 17A shows distribution of currents and electric fields of the MIMO antenna apparatus in the CM slot antenna pattern. It can be learned from FIG. 17A that the currents are distributed in a same direction on two sides of the gap 25, but the electric fields are distributed in opposite directions on two sides of the gap 25. The currents and electric fields shown in FIG. 17A may be respectively referred to as currents and electric fields in the CM slot antenna pattern. The currents and the electric fields in the CM slot antenna pattern are generated when the slots on two sides of the gap 25 each work in the ¼ wavelength mode. The currents are weak in the gap 25 of the slot 21, and are strong at both ends of the slot 21. The electric fields are strong in the gap 25 of the slot 21, and are weak at both ends of the slot 21.

FIG. 17B shows distribution of currents and electric fields of the MIMO antenna apparatus in the DM slot antenna pattern. It can be learned from FIG. 17B that the currents are distributed in opposite directions on two sides of the gap 25, but the electric fields are distributed in a same direction on two sides of the gap 25. The currents and electric fields shown in FIG. 17B may be respectively referred to as currents and electric fields in the DM slot antenna pattern. The currents and electric fields in the DM slot antenna pattern are generated when the entire slot 21 works in the ½ wavelength mode. The currents are weak in the gap 25 of the slot 21, and are strong at both ends of the slot 21. The electric fields are strong in the gap 25 of the slot 21, and are weak at both ends of the slot 21.

Figure 18:
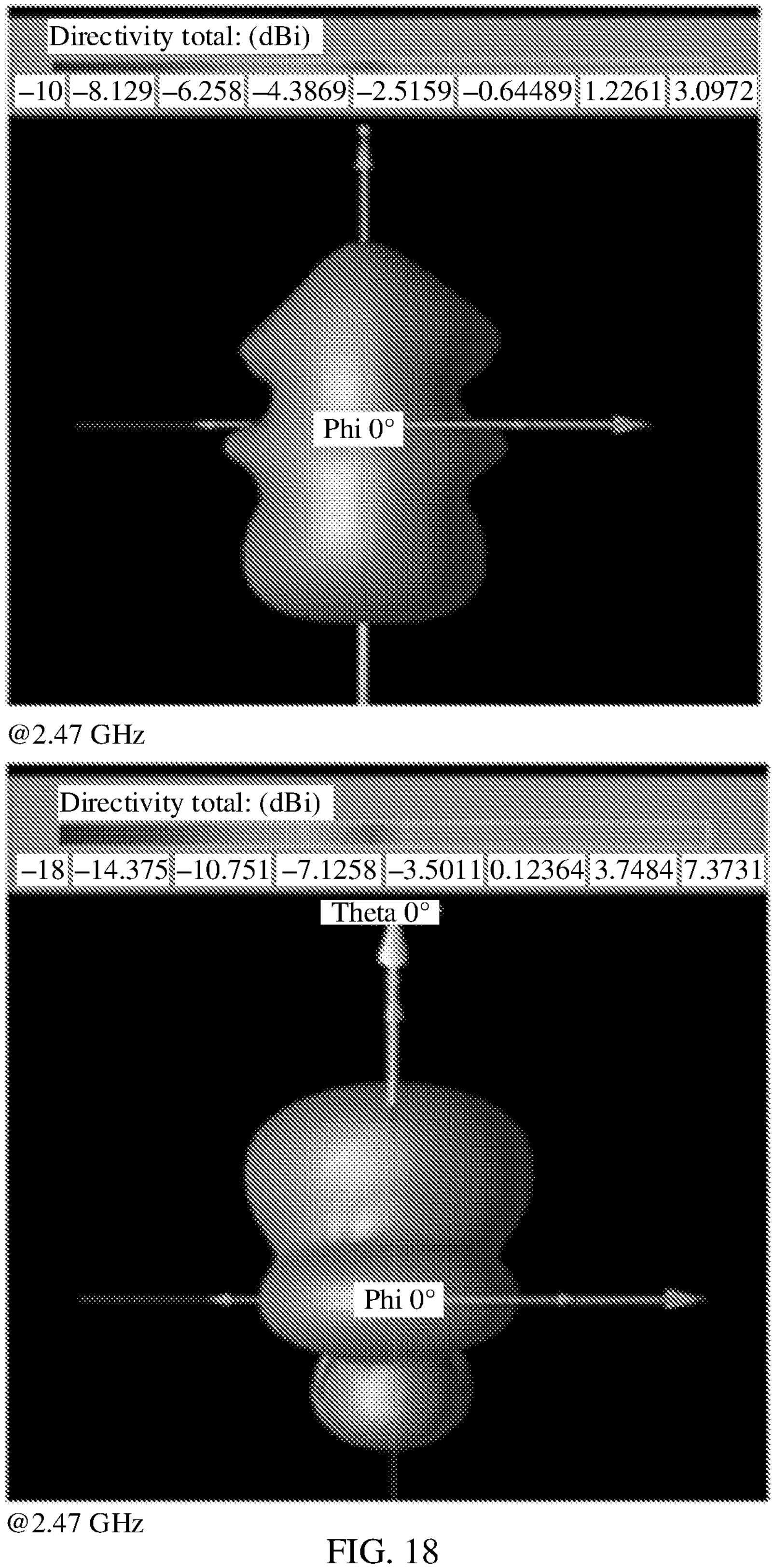
FIG. 18 is a diagram of radiation directions of an antenna apparatus according to Embodiment 2.

FIG. 18 is a diagram of radiation directions of the slot antenna simulation shown in FIG. 15A to FIG. 15D. An ECC is calculated according to the diagram of the radiation directions shown in FIG. 18. An ECC of the CM slot antenna pattern and the DM slot antenna pattern near 2.47 GHz may be as low as 0.04.

It can be learned that, in the antenna design solution provided in Embodiment 2, through symmetric feeding and anti-symmetric feeding, two medium- and high-frequency (an operating frequency band is near Wi-Fi 2.4 GHz) antennas, namely, a CM slot antenna and a DM slot antenna, can be excited on a short slot antenna radiator, to achieve characteristics such as high isolation and a low ECC of the MIMO antenna in a medium- and high-frequency wideband. In addition, in Embodiment 2, a form of co-feeding may be used, that is, two slot antenna modes share a same slot antenna radiator, to save antenna design space.

In the foregoing embodiment, the feeding point M and the feeding point N may be respectively referred to as a first feeding point and a second feeding point. The feeding point S on the bridge structure 29 may be referred to as a third feeding point.

Figure 21A:
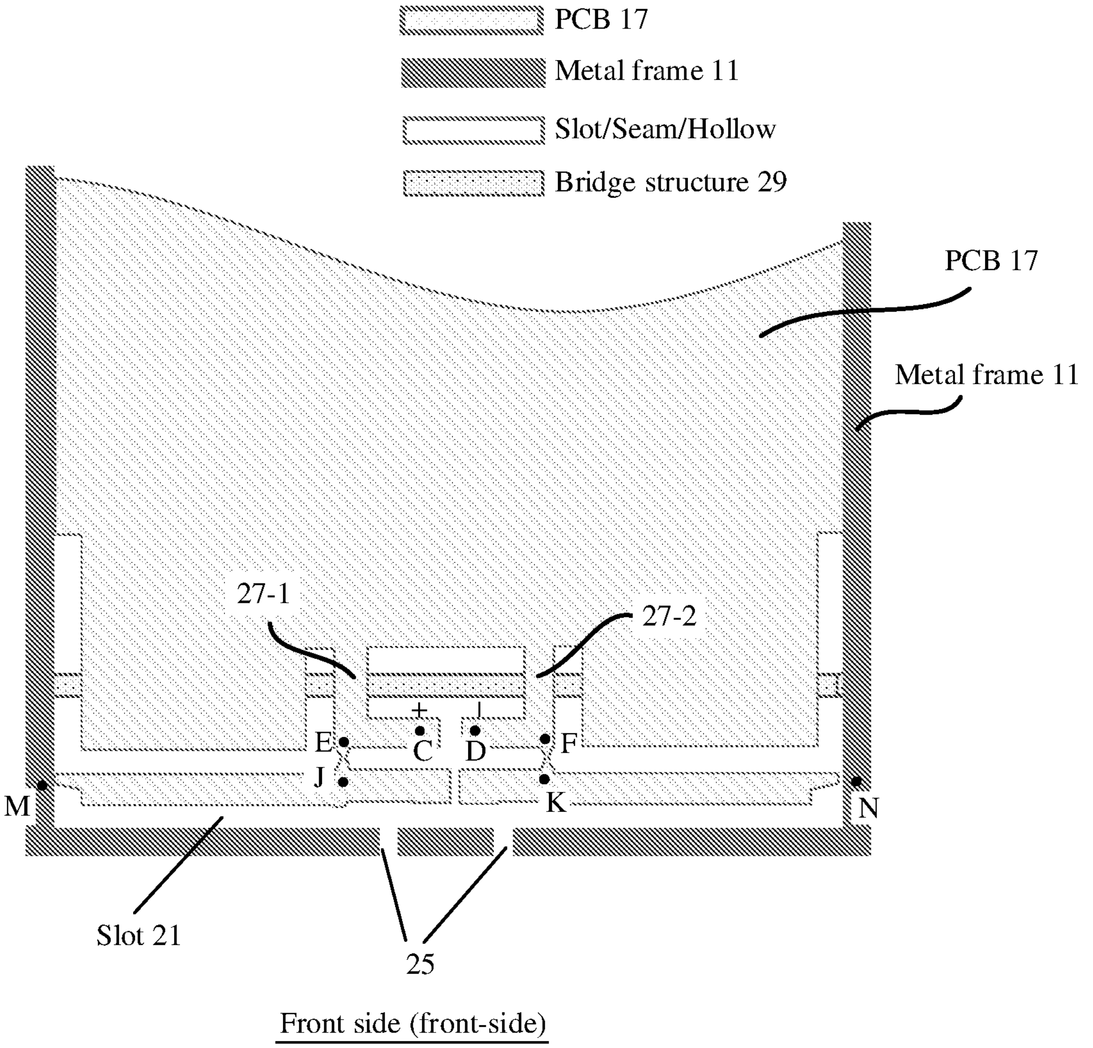
FIG. 21A is a front-side view of an antenna apparatus according to Embodiment 2.
Figure 21B:
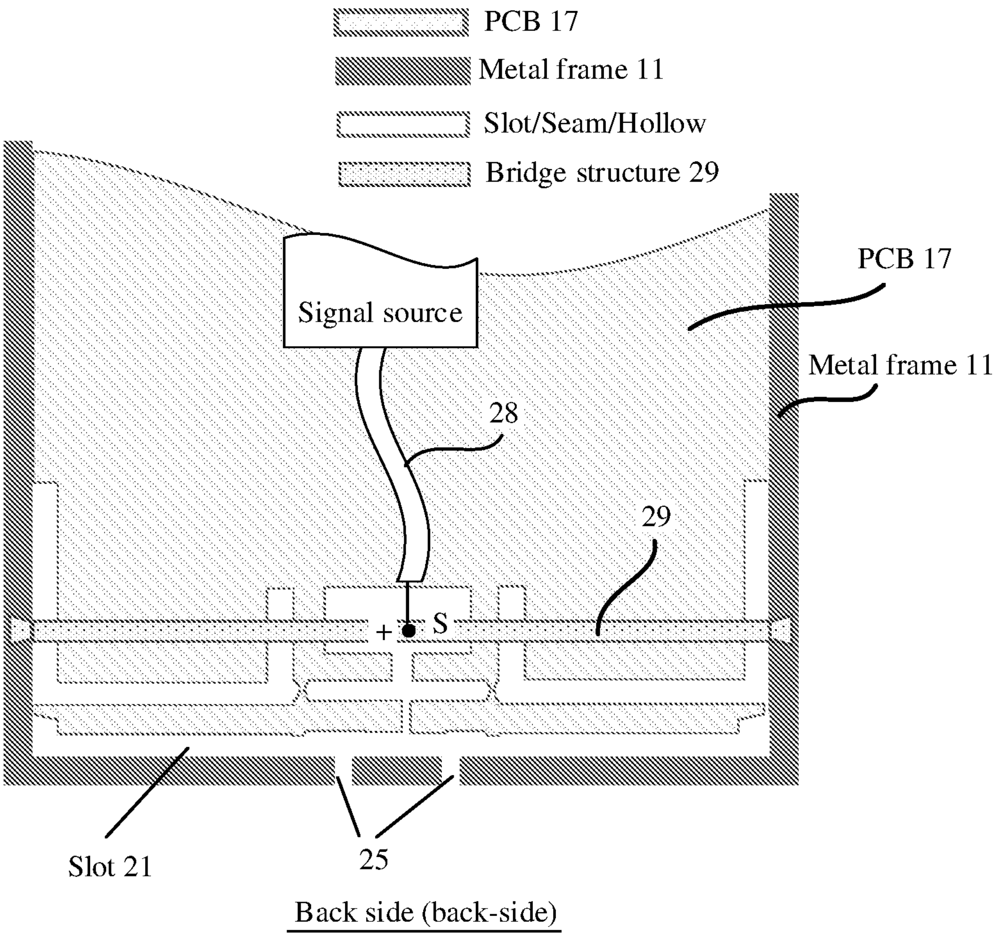
FIG. 21B is a back-side view of an antenna apparatus according to Embodiment 2.

In the foregoing embodiment, it is not limited that the feeding point M and the feeding point N are disposed close to the gap. Alternatively, the feeding point M and the feeding point N may be separately disposed close to two ends of the slot 21, as shown in FIG. 21A and FIG. 21B.

Figure 19:
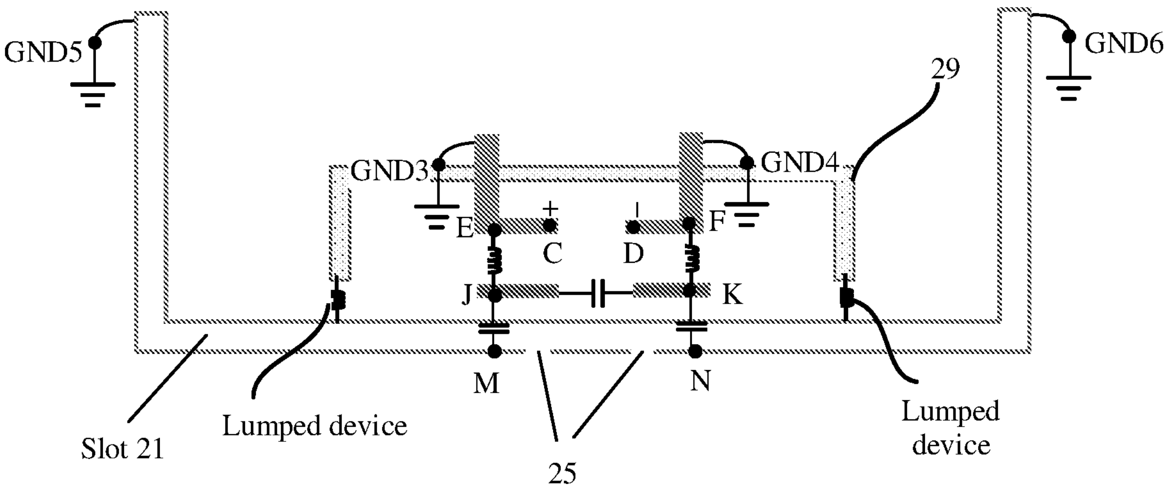
FIG. 19 is an extended implementation of a “bridge” structure according to an embodiment of this application.

In the feeding structure in the foregoing embodiment, a size of the “bridge” structure (that is, the bridge structure 29) is large, and some lumped devices (such as a lumped inductor) may be added to reduce the size, as shown in FIG. 19. The “bridge” structure is not limited to being implemented by the bridge structure 29, and the "bridge" structure may alternatively be formed by hollowing out the PCB ground layer.

Figure 20:
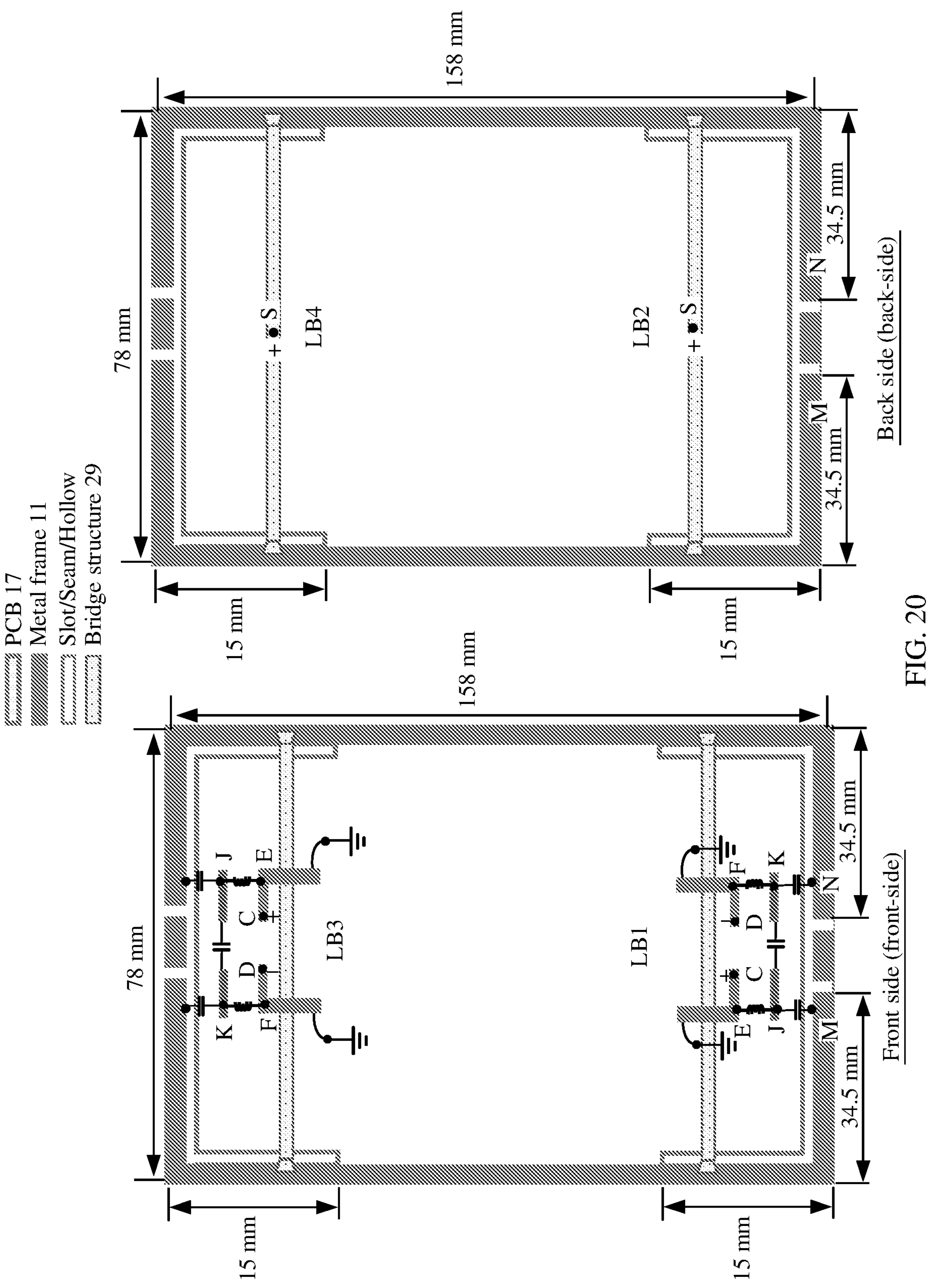
FIG. 20 is a schematic diagram of a 4×4 MIMO antenna according to an embodiment of this application.

The MIMO antenna apparatus provided in the foregoing embodiment is not limited to being disposed at the bottom of the electronic device 10, and may alternatively be disposed at the top or on a side edge of the electronic device 10, as shown in FIG. 20. It can be learned that, compared with a conventional MIMO antenna, the co-feeding slot antenna provided in embodiments of this application can save a lot of space when a 4×4 MIMO antenna is implemented.

The antenna design solution provided in the foregoing embodiment is not limited to being implemented in an electronic device with a metal frame ID. The slot 21 mentioned in the foregoing embodiment may alternatively be formed by using a metal middle frame and the PCB 17.

In actual application, a structure of an electronic device is generally difficult to be completely symmetric, and a connection position of a matching network or a "bridge" structure may be adjusted to compensate for the structure imbalance.

In this application, a wavelength in a wavelength mode (for example, a ½ wavelength mode or a ¼ wavelength mode) of an antenna may be a wavelength of a signal radiated by the antenna. For example, a ½ wavelength mode of an antenna may generate a resonance in a 2.4 GHz frequency band, and a wavelength in the ½ wavelength mode is a wavelength of a signal radiated by the antenna in the 2.4 GHz frequency band. It should be understood that a wavelength of a radiated signal in the air may be calculated as follows: Wavelength=Speed of light/Frequency, where the frequency is a frequency of the radiated signal. A wavelength of a radiated signal in a medium may be calculated as follows: Wavelength=(Speed of light/$\sqrt{\varepsilon}$)/Frequency, where $\varepsilon$ is a relative dielectric constant of the medium, and the frequency is a frequency of the radiated signal.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:

a printed circuit board (PCB) ground layer;

a metal frame; and an antenna apparatus, comprising a slot, a first feeding point, a second feeding point, and a bridge structure;

wherein the slot is between the PCB ground layer and a first segment of the metal frame, ends of the slot are grounded, the slot is defined by a first side edge and a second side edge, the first side edge is an edge of the PCB ground layer, the second side edge is an edge of the first segment of the metal frame, a gap extends in the first segment, the first segment comprises a first part and a second part, the first part is located on a first side of the gap, and the second part is located on a second side of the gap;

wherein the first feeding point is located on the first part, the second feeding point is located on the second part, and the first feeding point and the second feeding point are respectively connected to a positive electrode and a negative electrode of a feed of the antenna apparatus;

wherein the bridge structure comprises a first end and a second end, the first end is connected to the first part, the second end is connected to the second part, the bridge structure is a unitary structure between the first end and the second end, a third feeding point is disposed on the bridge structure, and the third feeding point is connected to the positive electrode of the feed; and wherein the first feeding point and the second feeding point are connected to a feeding network, and the feeding network comprises two symmetric parallel conducting wires that are defined by hollows in the PCB ground layer, and a hollow of the PCB ground layer extends from a sidewall of one conducting wire of the two symmetric parallel conducting wires to a sidewall of the other conducting wire of the two symmetric parallel conducting wires.

2. The electronic device according to claim 1, wherein the slot is a U-shaped slot, or the slot is a strip-shaped slot, or the slot is an L-shaped slot.

3. The electronic device according to claim 1, wherein a position of the antenna apparatus in the electronic device is one or more of the following:

a bottom of the electronic device, a top of the electronic device, or a side edge of the electronic device.

4. The electronic device according to claim 1, wherein the first feeding point is connected to a center conductor of a coaxial transmission line and the second feeding point is connected to an outer conductor of the coaxial transmission line.

5. The electronic device according to claim 1, wherein the bridge structure is a laser direct structuring (LDS) metal support configured on a PCB of the electronic device.

6. An electronic device, comprising:

a printed circuit board (PCB) ground layer;

a metal frame; and an antenna apparatus, comprising a slot, a first feeding point, a second feeding point, and a bridge structure;

wherein the slot extends between the PCB ground layer and a first segment of the metal frame, ends of the slot are grounded, the slot is defined by a first side edge and a second side edge, the first side edge is a side edge of the PCB ground layer, the second side edge is a side edge of the first segment of the metal frame, the first segment comprises a first part, a second part, and a third part, the first part is located on a first side of the third part, the second part is located on a second side of the third part, and the third part comprises a first gap, a second gap, and a suspended segment located between the first gap and the second gap;

wherein the first feeding point is located on the first part, the second feeding point is located on the second part, and the first feeding point and the second feeding point are respectively connected to a positive electrode and a negative electrode of a feed of the antenna apparatus;

wherein the bridge structure comprises a first end and a second end, the first end is connected to the first part, the second end is connected to the second part, the bridge structure is a unitary structure between the first end and the second end, a third feeding point is disposed on the bridge structure, and the third feeding point is connected to the positive electrode of the feed; and wherein the bridge structure is further connected to the suspended segment.

7. The electronic device according to claim 6, wherein the bridge structure comprises a T-shaped structure, the T-shaped structure comprises a horizontal stub and a vertical stub, two ends of the horizontal stub are respectively the first end and the second end and are respectively connected to the first part and the second part, and the vertical stub is connected to the suspended segment.

8. The electronic device according to claim 6, wherein the first feeding point and the second feeding point are connected to a feeding network, and the feeding network comprises two symmetric parallel conducting wires that are defined by hollows in the PCB ground layer.

9. The electronic device according to claim 6, wherein the slot is a U-shaped slot, or the slot is a strip-shaped slot, or the slot is an L-shaped slot.

10. The electronic device according to claim 6, wherein a position of the antenna apparatus in the electronic device is one or more of the following: a bottom of the electronic device, a top of the electronic device, or a side edge of the electronic device.

11. The electronic device according to claim 6, wherein the first feeding point is connected to a center conductor of a coaxial transmission line, and the second feeding point is connected to an outer conductor of a coaxial transmission line.

12. The electronic device according to claim 6, wherein the bridge structure is a laser direct structuring (LDS) metal support configured on a PCB of the electronic device.

13. A method, comprising:

communicating, by an electronic device, using a wireless communication technology, wherein the electronic device comprises:

a printed circuit board (PCB) ground layer;

a metal frame; and an antenna apparatus, comprising a slot, a first feeding point, a second feeding point, and a bridge structure;

wherein the slot is between the PCB ground layer and a first segment of the metal frame, ends of the slot are grounded, the slot is defined by a first side edge and a second side edge, the first side edge is an edge of the PCB ground layer, the second side edge is an edge of the first segment of the metal frame, a gap extends in the first segment, the first segment comprises a first part and a second part, the first part is located on a first side of the gap, and the second part is located on a second side of the gap;

wherein the first feeding point is located on the first part, the second feeding point is located on the second part, and the first feeding point and the second feeding point are respectively connected to a positive electrode and a negative electrode of a feed of the antenna apparatus;

wherein the bridge structure comprises a first end and a second end, the first end is connected to the first part, the second end is connected to the second part, the bridge structure is a unitary structure between the first end and the second end, a third feeding point is disposed on the bridge structure, and the third feeding point is connected to the positive electrode of the feed; and wherein the first feeding point and the second feeding point are connected to a feeding network, and the feeding network comprises two symmetric parallel conducting wires that are defined by hollows in the PCB ground layer, and a hollow of the PCB ground layer extends from a sidewall of one conducting wire of the two symmetric parallel conducting wires to a sidewall of the other conducting wire of the two symmetric parallel conducting wires.

14. The method according to claim 13, wherein the slot is a U-shaped slot, or the slot is a strip-shaped slot, or the slot is an L-shaped slot.

15. The method according to claim 13, wherein a position of the antenna apparatus in the electronic device is one or more of the following:

a bottom of the electronic device, a top of the electronic device, or a side edge of the electronic device.

16. The method according to claim 13, wherein the first feeding point is connected to a center conductor of a coaxial transmission line and the second feeding point is connected to an outer conductor of the coaxial transmission line.

17. The method according to claim 13, wherein the bridge structure is a laser direct structuring (LDS) metal support configured on a PCB of the electronic device.

* * * * *